(12) United States Patent
Maleki et al.

(10) Patent No.: US 11,295,231 B2
(45) Date of Patent: Apr. 5, 2022

(54) SYSTEMS, METHODS, AND COMPUTER-READABLE MEDIA FOR PARALLEL STOCHASTIC GRADIENT DESCENT WITH LINEAR AND NON-LINEAR ACTIVATION FUNCTIONS

(71) Applicant: Microsoft Technology Licensing, LLC, Redmond, WA (US)

(72) Inventors: Saeed Maleki, Redmond, WA (US); Madanlal S. Musuvathi, Redmond, WA (US); Todd D. Mytkowicz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 935 days.

(21) Appl. No.: 15/600,838

(22) Filed: May 22, 2017

(65) Prior Publication Data

US 2018/0330271 A1 Nov. 15, 2018

Related U.S. Application Data

(60) Provisional application No. 62/505,292, filed on May 12, 2017.

(51) Int. Cl.
*G06F 15/18* (2006.01)
*G06N 3/08* (2006.01)
(Continued)

(52) U.S. Cl.
CPC ............ *G06N 20/00* (2019.01); *G06K 9/627* (2013.01); *G06N 20/20* (2019.01); *G06N 3/08* (2013.01); *G06N 20/10* (2019.01)

(58) Field of Classification Search
CPC ........ G06N 20/00; G06N 20/20; G06N 20/10; G06N 3/08; G06K 9/627
See application file for complete search history.

(56) References Cited

U.S. PATENT DOCUMENTS 8,626,677 B2   1/2014   Chen et al.
9,201,989 B2  12/2015   Haas et al.
(Continued)

OTHER PUBLICATIONS

Fast Asynchronous Parallel Stochastic Gradient Descent: A Lock-Free Approach with Convergence Guarantee Shen-Yi Zhao, Wu-Jun Li, Thirtieth AAAI Conference on Artificial Intelligence (AAAI-16), Feb. 12-17, 2016. (Year: 2016).*

(Continued)

*Primary Examiner* — Kakali Chaki
*Assistant Examiner* — Su-Ting Chuang
(74) *Attorney, Agent, or Firm* — Faegre Drinker Biddle & Reath LLP

(57) ABSTRACT

Systems, methods, and computer-readable media are disclosed for parallel stochastic gradient descent using linear and non-linear activation functions. One method includes: receiving a set of input examples; receiving a global model; and learning a new global model based on the global model and the set of input examples by iteratively performing the following steps: computing a plurality of local models having a plurality of model parameters based on the global model and at least a portion of the set of input examples; computing, for each local model, a corresponding model combiner based on the global model and at least a portion of the set of input examples; and combining the plurality of local models into the new global model based on the current global model and the plurality of corresponding model combiners.

15 Claims, 10 Drawing Sheets

(51) Int. Cl.
  *G06N 20/00* (2019.01)
  *G06K 9/62* (2006.01)
  *G06N 20/20* (2019.01)
  *G06N 20/10* (2019.01)

(56) References Cited

U.S. PATENT DOCUMENTS

| | | | |
|---|---|---|---|
| 9,412,365 | B2 | 8/2016 | Biadsy et al. |
| 9,508,347 | B2 | 11/2016 | Wang et al. |
| 2003/0225763 | A1* | 12/2003 | Guilak .............. G06F 16/353 |
| 2015/0339570 | A1* | 11/2015 | Scheffler .............. G06N 3/04 706/16 |
| 2016/0103901 | A1 | 4/2016 | Kadav et al. |

OTHER PUBLICATIONS

Krishnan, Interactive Data Cleaning for Statistical Modeling, Proceedings of the VLDB Endowment, Aug. 2016 (Year: 2016).*
Hall, et al., "MapReduce/Bigtable for Distributed Optimization", in Proceedings of NIPS LCCC Workshop, Jan. 2010, pp. 1-7.
Weimer, et al., "A Convenient Framework for Efficient Parallel Multipass Algorithms", in Proceedings of Workshop on Learning on Cores, Clusters and Clouds, Dec. 2010, pp. 1-4.
Sra, et al., "AdaDelay: Delay Adaptive Distributed Stochastic Optimization", in Proceedings of the 19th International Conference on Artificial Intelligence and Statistics, vol. 51, May 2, 2016, pp. 957-965.
Achlioptas, Dimitris., "Database-friendly random projections", in Proceedings of the twentieth ACM SIGMOD-SIGACT-SIGART symposium on Principles of database systems, May 1, 2001, pp. 274-281.
Agarwal, et al., "A reliable effective terascale linear learning system", in the Journal of Machine Learning Research, vol. 15, Issue 1, Jan. 2014, pp. 1111-1133.
"Amazon EC2 X1 Instances", https://aws.amazon.com/ec2/instance-types/x1/, Retrieved on: Apr. 7, 2017, 7 pages.
Bailey, David H., "Twelve Ways to Fool the Masses When Giving Performance Results on Parallel Computers", https://www.google.co.in/url?sa=t&rct=j&q=&esrc=s&source=web&cd=1&cad=rja&uact=8&ved=0ahUKEwiAzeeBzpHTAhWMPI8KHTdrAG4QFgghMAA&url=http%3A%2F%2Fcrd-legacy.lbl.gov%2F~dhbailey%2Fdhbpapers%2Ftwelve-ways.pdf&usg=AFQjCNHZpW72WYEs6N0eypxt1ePJ4aEckg, Published on: Jun. 11, 1991, 4 pages.
Bottou, Leon, "Stochastic Gradient Descent Tricks", in Publication of Spring, Jan. 1, 2012, pp. 1-16.
Zaharia, et al., "Spark Survey 2015 Results are now available", https://databricks.com/blog/2015/09/24/spark-survey-2015-results-are-now-available.html, Sep. 24, 2015, 4 pages.
Drineas, et al., "RandNLA: Randomized Numerical Linear Algebra", in Journal of Communications of the ACM, vol. 59, No. 6, Jun. 2016, pp. 80-90.
Duchi, et al., "Adaptive Subgradient Methods for Online Learning and Stochastic Optimization", in the Journal of Machine Learning Research, vol. 12, Jul. 2011, pp. 2121-2159.
"Intel® Math Kernel Library (Intel® MKL)", https://software.intel.com/en-us/intel-mkl, Retrieved on: Apr. 7, 2017, 4 pages.
Johnson, et al., et al. "Extensions of Lipschitz mappings into a Hilbert space", in Journal of Contemporary mathematics. vol. 26, May 1984, pp. 189-206.
Langford, et al., "Vowpal Wabbit", https://github.com/JohnLangford/vowpal_wabbit/wiki, Dec. 6, 2016, 2 pages.
Langford, et al., "Slow learners are fast", in Journal of Machine Learning Research, vol. 1, Jan. 2009, pp. 1-23.
Li, et al., "Scaling distributed machine learning with the parameter server", in Proceedings of the 27th International Conference on Neural Information Processing Systems, Dec. 8, 2014, pp. 1-16.
Niu, et al., "Hogwild!: A Lock-Free Approach to Parallelizing Stochastic Gradient Descent", in Proceedings of Advances in Neural Information Processing Systems, Jun. 2011, pp. 1-9.
Li, et al., "Communication efficient distributed machine learning with the parameter server", in Proceedings of the 27th International Conference on Neural Information Processing Systems, Dec. 8, 2014, pp. 1-16.
Sallinen, et al., "High performance parallel stochastic gradient descent in shared memory", in Proceedings of IEEE International Parallel and Distributed Processing Symposium, Jul. 21, 2016, pp. 1-10.
Zinkevich, et al., "Parallelized stochastic gradient descent", in Proceedings of 24th Annual Conference on Neural Information Processing Systems, Dec. 6, 2010, pp. 1-36.
Mcsherry, et al., "Scalability! But at what COST?", HOTOS'15 Proceedings of the 15th USENIX conference on Hot Topics in Perating Systems, May 2015, 6 pages.

* cited by examiner

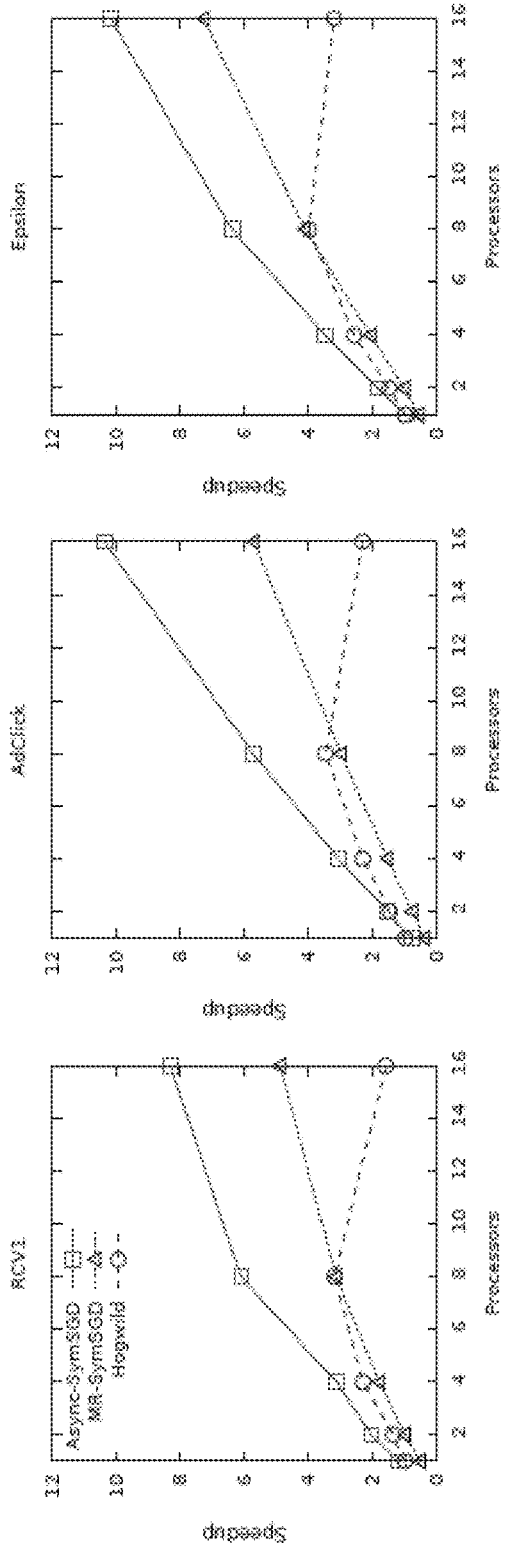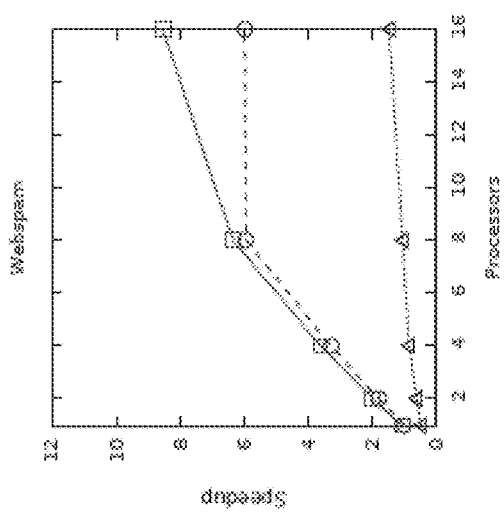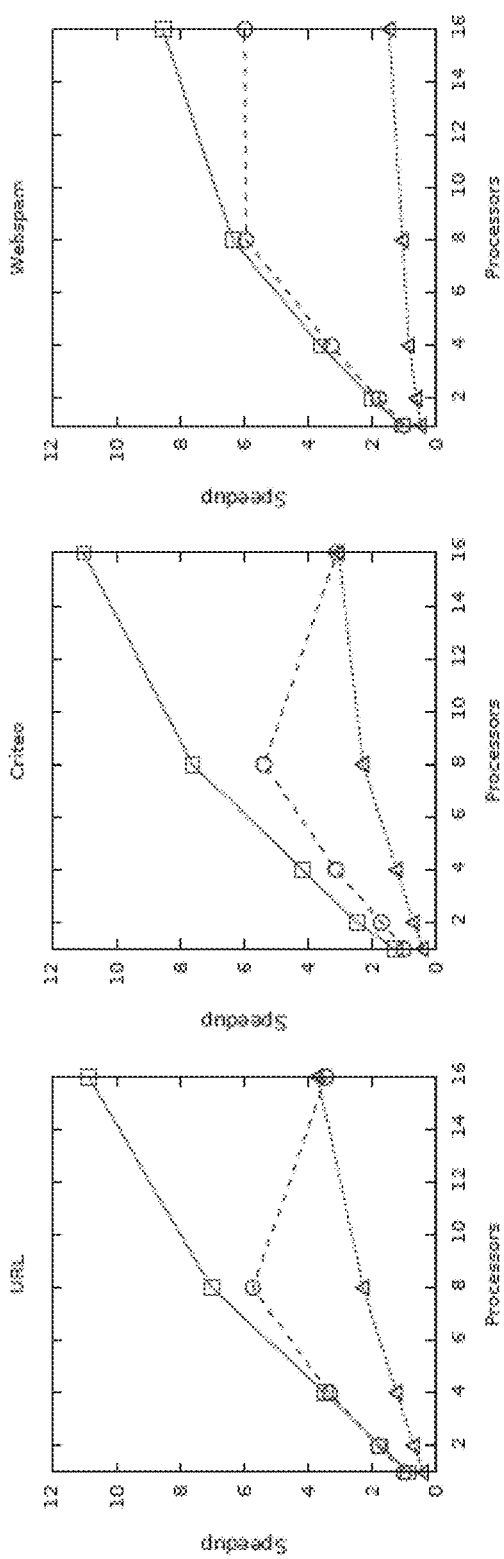
FIG. 3A  FIG. 3B  FIG. 3C  FIG. 3D  FIG. 3E  FIG. 3F

SYSTEMS, METHODS, AND COMPUTER-READABLE MEDIA FOR PARALLEL STOCHASTIC GRADIENT DESCENT WITH LINEAR AND NON-LINEAR ACTIVATION FUNCTIONS

CROSS-REFERENCE TO RELATED APPLICATIONS

The present application claims the benefit of priority to U.S. Provisional Application No. 62/505,292, entitled "SYSTEMS, METHODS, AND COMPUTER-READABLE MEDIA FOR PARALLEL STOCHASTIC GRADIENT DESCENT WITH LINEAR AND NON-LINEAR ACTIVATION FUNCTIONS," and filed on May 12, 2017, which is incorporated herein by reference in its entirety.

TECHNICAL FIELD

Embodiments of the present disclosure relate generally to training machine learning models. More specifically, embodiments of the present disclosure relate to machine learning models that may be trained using parallel stochastic gradient descent algorithms with linear and non-linear activation functions.

INTRODUCTION

In Stochastic Gradient Descent ("SGD"), a machine learning model training system operates iteratively to determine values of the model parameters by finding a minimum of an objective function of parameters of the model. SGD is an effective method for many machine learning problems. SGD is an algorithm with few hyper-parameters, and SGD's convergence rates are well understood both theoretically and empirically. However, SGD performance scalability may be severely limited by its inherently sequential computation. SGD iteratively processes an input dataset, in which each iteration's computation depends on model parameters learned from a previous iteration.

Current approaches for parallelizing SGD allow for learning local models per thread, and then combining these models in ways that do not honor this inter-step dependence. For example, in current approaches to parallelize SGD, such as HOGWILD!, threads, in a race-like manner, update a shared global model without holding any locks. In another approach, such as parameter-server, each thread (or machine) may periodically send its model deltas to a server that applies the model deltas to a global model, even though the model deltas were computed on a stale model from previous updates.

While these algorithms in current approaches may be guaranteed to eventually converge, the current approaches need to carefully manage the communication staleness trade-off. For example, HOGWILD! communicates after processing every input example to achieve a bounded staleness. However, the resulting communication cost limits scalability even in a single machine on sparse datasets. As shown in experiments, even sparse datasets have frequent features that produce significant cache traffic. In other current approaches, such as ALLREDUCE, staleness causes a drop in accuracy on the same number of examples with respect to a sequential baseline.

Thus, there exists a need to provide a parallel SGD algorithm that allows threads to communicate less frequently, but also achieve a high-fidelity approximation to what the threads would have produced had they run sequentially.

SUMMARY OF THE DISCLOSURE

According to certain embodiments, systems, methods, and computer-readable media are disclosed for parallel stochastic gradient descent with linear and non-linear activation functions.

According to certain embodiments, computer-implemented methods for parallel stochastic gradient descent using linear and non-linear activation functions are disclosed. One method includes: receiving a set of input examples, the set of examples including a plurality of vectors of feature values and a corresponding label to learn; receiving a global model, the global model used to compute a plurality of local models based on the set of input examples; and learning a new global model based on the global model and the set of input examples by iteratively performing the following steps: computing a plurality of local models having a plurality of model parameters based on the global model and at least a portion of the set of input examples; computing, for each local model, a corresponding model combiner based on the global model and at least a portion of the set of input examples; and combining the plurality of local models into the new global model based on the current global model and the plurality of corresponding model combiners.

According to certain embodiments, systems for parallel stochastic gradient descent using linear and non-linear activation functions are disclosed. One system including: a data storage device that stores instructions for parallel stochastic gradient descent using linear and non-linear activation functions; and a processor configured to execute the instructions to perform a method including: receiving a set of input examples, the set of examples including a plurality of vectors of feature values and a corresponding label to learn; receiving a global model, the global model used to compute a plurality of local models based on the set of input examples; and learning a new global model based on the global model and the set of input examples by iteratively performing the following steps: computing a plurality of local models having a plurality of model parameters based on the global model and at least a portion of the set of input examples; computing, for each local model, a corresponding model combiner based on the global model and at least a portion of the set of input examples; and combining the plurality of local models into the new global model based on the current global model and the plurality of corresponding model combiners.

According to certain embodiments, non-transitory computer-readable media storing instructions that, when executed by a computer, cause the computer to perform a method for parallel stochastic gradient descent using linear and non-linear activation functions are disclosed. One computer-readable medium storing instructions that, when executed by a computer, cause the computer to perform the method including: receiving a set of input examples, the set of examples including a plurality of vectors of feature values and a corresponding label to learn; receiving a global model, the global model used to compute a plurality of local models based on the set of input examples; and learning a new global model based on the global model and the set of input examples by iteratively performing the following steps: computing a plurality of local models having a plurality of model parameters based on the global model and at least a portion of the set of input examples; computing, for each local model, a corresponding model combiner based on the global model and at least a portion of the set of input examples; and combining the plurality of local models into the new global model based on the current global model and the plurality of corresponding model combiners.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

FIGS. 3A-3F depict graphs showing differences between parallel SGD algorithms of the present disclosure (Async-SYMSGD and MR-SYMSGD) and HOGWILD! for various exemplary datasets;

Figure 1:
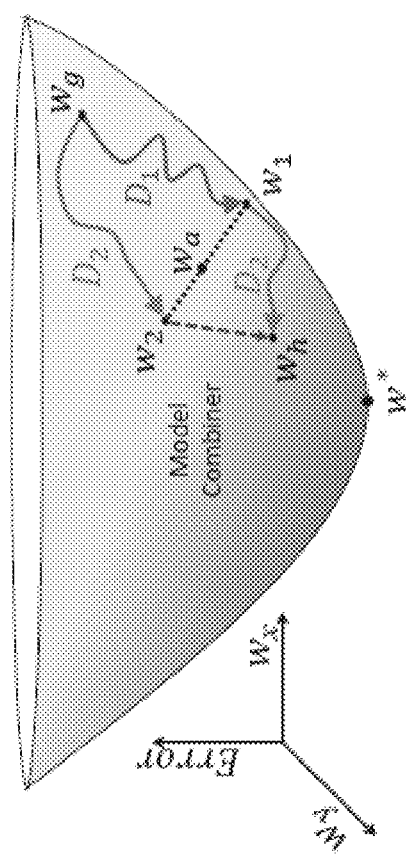
FIG. 1 depicts a convex error function for a two-dimensional feature space, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF THE EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a parallel Stochastic Gradient Descent ("SGD") algorithm that allows threads to communicate less frequently and achieve a high-fidelity approximation to what the threads would have produced had the threads run sequentially. A key aspect of the parallel SGD algorithm of the present disclosure is for each thread to generate a sound model combiner that precisely captures the first-order effects of a SGD computation starting from an arbitrary model. Periodically, the threads may update a global model with their local model while using a model combiner to account for changes in the global model that occurred in the interim.

While the parallel SGD algorithm may be generalized to different machine learning problems and on different parallel settings, such as distributed clusters and GPUs, the present disclosure describes techniques in the context of evaluation on linear learners on multi-core machines, which may be primarily motivated by the fact that this setting forms the core of machine learning presently. For example, some developers have trained over one (1) million models per month in 2016 on single-node installations. Likewise, a 2015 survey has shown almost 50% of Spark installations are single-node. As machines with terabytes of memory become commonplace, machine learning tasks on large datasets may be done efficiently on single machines without paying the inherent cost of distribution. Thus, the present disclosure discusses the parallel SGD algorithm being evaluated on linear learners on multi-core machines. However, the present disclosure may not be limited to such systems, and may be applicable to different parallel settings, such as distributed clusters and GPUs, as described in more detail below. A person of ordinary skill in the art may apply the techniques described herein to other environments and systems.

The present disclosure relates to a parallel SGD (sometimes referred to as Symbolic SGD or SYMGSD) that is fast, scales well on multiple cores, and achieves the same accuracy as a sequential SGD. When compared to optimized sequential baseline, the SYMGSD of the present disclosure may achieve a speedup on a multi-core system, such as, for example, from a 8.3 times speedup to a 11 times speedup on a 16 core system. Thus, a speedup on average is observed when compared to current approaches discussed above, such as, for example, a speedup of 2.25 times over HOGWILD!

In a parallel SGD algorithm of the present disclosure, a set of N input examples $z_i=(x_i, y_i)$ may be given. $x_i$ may be a vector of feature values (f), and $y_i$ may be a label to learn. A convex cost function to minimize may be represented by $$C(w) = \frac{1}{N}\sum_{i=1}^{N} C_{z_i}(w, x_i, y_i) \qquad (1)$$

Accordingly, an object of the present disclosure is to find $$w^* = \arg\min_{w \in \mathbb{R}^f} \frac{1}{N}\sum_{i=1}^{N} C_{z_i}(w, x_i, y_i) \qquad (2)$$

The cost function may optionally include a regularization term. Gradients may be defined as $$G \triangleq \frac{\partial C}{\partial w} \text{ and } G_{z_r} \triangleq \frac{\partial C_{z_r}}{\partial w},$$

and Hessian of the cost function may be defined as $$H \triangleq \frac{\partial G}{\partial w} \text{ and } H_{z_r} \triangleq \frac{\partial G_{z_r}}{\partial w}.$$

At each step t, the parallel SGD may pick $z_r=(x_r, y_r)$ uniformly randomly from the input dataset, and may update the current model $w_t$ along the gradient $G_{z_r}$, as represented by the equation:

$$w_{t+1}=w_t-\alpha_t G_{z_r}(w_t, x_r, y_r) \qquad (3)$$

$\alpha_t$ may represent a learning rate that determines a magnitude of the update along the gradient. As equation 3 shows, $w_{t+1}$ may be dependent on $w_t$, and this dependence may make parallelization of SGD across iterations difficult.

FIG. 1 depicts a convex error function for a two-dimensional feature space, according to embodiments of the present disclosure. As shown in FIG. 1, the difficulty of making parallelization of SGD across iterations depicted. For instance, a processor may perform SGD on a sequence of examples $D_1$ from a global model $w_g$ to reach $w_1$. When processing a subsequent sequence $D_2$, a sequential SGD algorithm may necessarily start from $w_1$ to reach $w_h$. According to embodiments of the present disclosure, it may be desired to process $D_1$ and $D_2$ in parallel. However, the computation on $D_2$ may not start on $w_1$, which is known only after the computation on $D_1$ has completed.

As mentioned in the introduction above, current parallelization techniques, such as HOGWILD! and ALLREDUCE approach this problem by processing $D_1$ and $D_2$ starting from the same global model $w_g$, and respectively reaching the local models $w_1$ and $w_2$. Then, current parallelization techniques combine the local models $w_1$ and $w_2$ into a global model, but in an ad-hoc manner. For instance, ALLREDUCE computes a weighted average $w_a$ (see, FIG. 1) of $w_1$ and $w_2$, where the per-feature weights are chosen so as to prefer the processor that has a larger update for that feature. However, the ALLREDUCE approached does not necessarily reach $w_h$. $w_h$ being the model that a traditional sequential SGD would have produced. Alternatively, HOGWILD! attempts to avoid this staleness problem by frequently communicating after every input example (i.e., size of $D_1$ and $D_2$ is 1). However, a resulting communication cost hurts scalability particularly across multiple sockets. This is true even for sparse datasets due to the presence of frequently occurring features.

According to embodiments of the present disclosure, a parallel SGD (symbolic SGD/SYMSGD) may soundly combine local models to produce the same model as what a sequential SGD would have produced. Accordingly, as shown in FIG. 1, the parallel SGD of the present disclosure may provide a method to combine $w_1$ and $w_2$ into the global model $w_h$. The parallel SGD of the present disclosure may be required to adjust the computation of $D_2$ for the staleness $w_1-w_g$ in the starting model.

In order to adjust the computation of $D_2$, a second processor may perform a computation from $w_g+\Delta w$, where $\Delta w$ may be an unknown symbolic vector. This may allow for the second processor to both compute a local model (resulting from the concrete part) and a model combiner (resulting from the symbolic part) that accounts for changes in the initial state. Once both processors are done calculating, the second processor may find $w_h$ by setting $\Delta w$ to $w_1-w_g$, where $w_1$ is computed by the first processor. This parallelization approach of SGD may be extended to multiple processors where all processor produce a local model and a combiner (except for the first processor) and the local models are combined sequentially using the combiners.

A SGD computation of dataset D starting from w may be represented by $S_D(w)$. Thus, for example, for local model $w_1$, $w_1 = S_{D_1}(w_g)$, as shown in FIG. 1. To generate the model combiner, $S_D(w+\Delta w)$, may be determined. Assuming that $S_D$ is differentiable, a Taylor series expansion may be:

$$S_D(w+\Delta w) = S_D(w) + S'_D(w) \cdot \Delta w + O(\|\Delta w\|_2^2) \quad (4)$$

$$M_D \triangleq S'_D = \frac{\partial S}{\partial w}$$

may be defined as the model combined. In equation (4) above, the model combiner may capture a first order effect of how a $\Delta w$ change in $w_g$ may affect the SGD computation. For example, by using $\Delta w = w_1 - w_g$ in equation (4), the local models, as shown in FIG. 1, may be combined to generate $w_h$.

Further, when $\Delta w$ is sufficiently small, the second order term may be neglected, and the model combiner may be used to combine local models with sufficient fidelity.

Model combiners may provide flexibility to design parallel SGD algorithms. As explain in more detail below, model combiners allow for a parallel SGD using map-reduce functionality and allow for a parallel SGD using asynchronous functionality. In model combiners that allow for a parallel SGD to use map-reduce functionality, for the map phase, each processor $i \in [1, N]$ may start from the same global model $w_g$, and each processor may compute a local model $S_{D_i}(w_g)$ and a model combiner $M_{D_i}(w_g)$ in parallel. In a subsequent reduce phase, the local models may be combined by adjusting the input of processor i by $w_{i-1} - w_g$, as indicated by the equation below:

$$w_i = S_{D_i}(w_g) + M_{D_i}(w_g) \cdot (w_{i-1} - w_g) \quad (5)$$

Machine learning algorithms, such as linear regression, linear regression with L2 regularization, and polynomial regression may have a linear update to the model parameters, but not necessarily linear on the input example). In such cases, the higher order terms in equation (4) may vanish. Accordingly, for such machine learning algorithms, model combiners may generate exactly the same model as a sequential SGD.

Specifically, a standard linear regression with square loss machine learning algorithm, the combiner matrix may be given by:

$$M_D(w) = \prod_{i=n}^{1} (I - \alpha_i \cdot x_i \cdot x_i^T) \quad (6)$$

when computing on $D = (x_1, y_1), \ldots, (x_n, y_n)$.

Since the model combiner may be independent of w, the model combiner may be computed once and may be reused in subsequent phases provided that the learning rates do not change.

Further, for a logistic regression machine learning algorithm, which has a update rule:

$$w_i = w_{i-1} - \alpha \cdot (\sigma(x_i \cdot w_{i-1}) - y_i) \cdot x_i \quad (7)$$

where $\sigma$ may be the sigmoid function, the model combiner may be given by:

$$M_D(w) = \prod_{i=n}^{1} (I - \alpha_i \cdot \sigma'(x_i \cdot w_{i-1}) \cdot x_i \cdot x_i^T) \quad (8)$$

where $w_0 = w$.

The model combiner for logistic regression may be a model combiner generated for linear regression but with $\alpha$ scaled by $\sigma'(x_i \cdot w_{i-1})$.

Table 1 provides model combiners for linear learners. When the SGD update function is not differentiable, using the Taylor expansion in equation (4) may result in errors at points of discontinuity. However, assuming bounded gradients, these errors may not affect the convergence of the parallel SGD (SYMSGD) of the present disclosure, as discussed above.

TABLE 1

| Algorithm | SGD Update for z = (x,y) | Model Combiner $M_z(w,x,y,\alpha)$ |
|---|---|---|
| OLS | $w - \alpha(x \cdot w - y)$ | $I - \alpha \cdot x \cdot x^T$ |
| Logistic | $w - \alpha(\sigma(x \cdot w) - y)$ | $I - \alpha\sigma'(x \cdot w) \cdot x \cdot x^T$ |
| Perceptron | $w + \alpha(y \cdot x \cdot \delta_{y \cdot x \cdot w \leq 0})$ | I |
| Support Vector Machine ("SVM") | $w - \alpha(\lambda w - y \cdot x \cdot \delta_{x \cdot w > 1})$ | $(1 - \alpha\lambda)I$ |
| Lasso | $[\max(0, u_i \triangleq w_i - \alpha(\lambda + s(i)(y - w \cdot x))x_i]_i$ | $[\delta_{u_i > 0} (\delta_{i-j} - \alpha s(i)x_i x_j)]_{ij}$ |

For linear learners of Table 1, $\lambda > 0$ may be an additional hyper-parameter and $\delta_\phi$ may be 1 when $\phi$ is true, else $\delta_\phi$ may be 0. In a Lasso linear learner, the model w may include positive $w_+$ and negative $w_-$ features with s(i) denoting the sign of feature i. $[v_i]_i$ may describe a vector with $v_i$ as the ith element and $[m_{ij}]_{ij}$ may represent a matrix with $m_{ij}$ as the (i,j)th element.

A challenge in using model combiners, as described above, may be that the model combiners are large f×f matrices. Machine learning problems may involve learning over tens of thousands to billions of features. Thus, it may be impossible to represent the model combiner explicitly. As described below, mechanisms may address the problem.

Accordingly, in embodiments of the present disclosure, a model combiner matrix may be projected into a smaller dimension while maintaining its fidelity. While the projection may generate an unbiased estimate of the model combiner, the model combiner's variance may affect convergence. As discussed above regarding convergence, it may be shown that with appropriate bounds on this variance, convergence may be guaranteed.

In embodiments of the present disclosure, a combiner matrix $M_D$ in a parallel SGD (SYMSGD) may be used and/or only used to be multiplied with a $\Delta w$. In order to avoid representing $M_D$ explicitly, $M_D \cdot A$ may be maintained for a randomly generated f×k matrix A with k≪f. Then, $M_D \cdot \Delta w$ may be estimated with $M_D \cdot A \cdot A^T \cdot \Delta w$. When the estimation is unbiased, the following may be observed.

$[m_{ij}]_{ij}$ may represent a matrix with $m_{ij}$ as an element in the ith row and jth column. $A = [a_{ij}]_{ij}$ may be a random f×k matrix with $a_{ij} = d_{ij}/\sqrt{k}$ where $d_{ij}$ may be independently sampled from a random distribution D with $E[D] = 0$ and $Var[D] = 1$. Then, $E[A \cdot A^T] = I_{f \times f}$, which may be based on the proof as follows. If $B = [b_{ij}]_{ij} \triangleq A \cdot A^T$, then $$E[b_{ij}] = \frac{1}{k} \sum_k E[a_{ik} a_{jk}].$$

When $i \neq j$, $E[b_{ij}]=0$ as $a_{ik}$ and $a_{jk}$ may be independent random variables with mean 0, and $E[b_{ij}]=1$ as the variance of $a_{ii}$ is 1.

Thus, the model combination with equation (27), as discussed below, may become:

$$w_t \approx S_{D_i}(w_g) + M_{D_i}(w_g) \cdot A \cdot A^T (w_{i-1} - w_g) \quad (9)$$

Equation (9) may allow for an efficient algorithm that computes a projected version of the combiner matrix, while still producing the same answer as the sequential SGD algorithm in expectation. Accordingly, the projection may incur a space and time overhead of O(z×k) where z may be a number of non-zeros in an example, $x_i$. The overhead may be acceptable for a small value of k. In exemplary embodiments of the present disclosure discussed in more detail below, k may be between values of 7 to 15 in various benchmarks and remain acceptable. Additionally, the overhead for such a small value k may be hidden by utilizing Single Instruction, Multiple Data ("SIMD") hardware within a processor. For example, as discussed in more detail below, the parallel SGD of the present disclosure (SYMSGD) with one thread may be half as slow as the sequential SGD.

After learning a local model and a projected model combiner in each processor, the parallel SGD of the present disclosure (SYMSGD) may combine the resulting local models using the projected model combiners. Additionally, optimizations, as follows, may be employed to improve efficiency. Note, that a subset of the data, $D_k$, may include a subset of total number of features. Embodiments of the present disclosure may take advantage of this property, and may allocate and initialize A for these observed features.

An unbiased estimation, as discussed above, may only be useful when a variance of the approximation is acceptably small. The variance of the projection described above may be determined as follows. A trace of a matrix M, tr(M) may be the sum of the diagonal elements of the matrix. $\lambda_i(M)$ may be the ith eigenvalue of M, and $\sigma_i(M) = \sqrt{\lambda_i(M^T \cdot M)}$ the ith singular value of M. $M \cdot \sigma_{max}(M)$ may be a maximum singular value of M. With $v = M \cdot A \cdot A^T \cdot \Delta w$, then, the trace of a covariance matrix $tr((\mathbb{C}(v))$ may be bounded by equation (10), as proven in more detail below.

$$tr(\mathbb{C}(v)) \geq \frac{\|\Delta w\|_2^2}{k} \sum_i \sigma_i^2(M) \quad (10)$$

$$tr(\mathbb{C}(v)) \leq \frac{\|\Delta w\|_2^2}{k} \left( \sum_i \sigma_i^2(M) + \sigma_{max}^2(M) \right)$$

Accordingly, the covariance may be small when k, which is the dimension of the projected space, is large. However, increasing k may proportionally increase the overhead of the parallel SGD algorithm. Similarly, covariance may be small when the projection happens on a small $\Delta w$. With respect to equation (9) above, $w_{i-1}$ may be as close to $w_g$ as possible, which may imply that processors may need to communicate frequently enough to ensure that their respective models may be roughly in-sync. Additionally, singular values of M may be as small as possible. Discussed in more detail below is an optimization that allows for the frequent communication and small values of M.

Variance and Covariance of $$\frac{1}{r} M \cdot A \cdot A^T \cdot \Delta w.$$

For simplicity below, w may be used instead of $\Delta w$, and r may be used instead of k for the size of the projected space. k may be used for summation indices. $v = M \cdot w$ may be estimated with $$\frac{1}{r} M \cdot A \cdot A^T \cdot w,$$

where A is a f×r matrix, where $a_{ij}$ is a random variable with the following properties: $E(a_{ij})=0$, $E(a_{ij}^2)=1$, and $E(a_{ij}^4)=\rho=3$. $m_s^T$ may be some row of M. Its estimation in $$M \cdot w \text{ is } v_s = \frac{1}{r} \cdot m_s^T \cdot A \cdot A^T \cdot w.$$

From the above, $E(v_s) = m_s^T \cdot w$. The notation ij=kl to is used to mean $i=k \wedge j=l$, and the notation ij≠kl is used to mean its negation. $m_s$, $m_t$ may be two rows of M, and the covariance of the resulting $v_s$ and $v_t$ is to be found.

$$r^2 \cdot E(v_s, v_t) = r^2 \cdot E\left( \frac{1}{r^2} \sum_{i,j,k} m_{si} a_{ij} a_{kj} w_k \cdot \sum_{i',j',k'} m_{ti'} a_{i'j'} a_{k'j'} w_{k'} \right) = \quad (11)$$

$$\sum_{i,j,k,i',j',k'} m_{si} m_{ti'} w_k w_{k'} E(a_{ij} a_{kj} a_{i'j'} a_{k'j'}) =$$

$$\sum_{i,j,k,i',j',k':ij=kj=i'j'=k'j'} m_{si} m_{ti'} w_k w_{k'} E(a_{ij} a_{kj} a_{i'j'} a_{k'j'}) +$$

$$\sum_{i,j,k,i',j',k':ij=kj\neq i'j'=k'j'} m_{si} m_{ti'} w_k w_{k'} E(a_{ij} a_{kj} a_{i'j'} a_{k'j'}) +$$

$$\sum_{i,j,k,i',j',k':ij=i'j'\neq kj=k'j'} m_{si} m_{ti'} w_k w_{k'} E(a_{ij} a_{kj} a_{i'j'} a_{k'j'}) +$$

$$\sum_{i,j,k,i',j',k':ij=k'j'\neq i'j'=kj} m_{si} m_{ti'} w_k w_{k'} E(a_{ij} a_{kj} a_{i'j'} a_{k'j'})$$

as terms with $E(a_{ij})$ cancel out =

$$\sum_{i,j} m_{si} m_{ti} w_i w_i \rho + \sum_{i,j,i',j':ij\neq i'j'} m_{si} m_{ti'} w_i w_{i'} +$$

$$\sum_{i,j,k:i\neq k} m_{si} m_{ti} w_k w_k + \sum_{i,j,k:i\neq k} m_{si} m_{tk} w_k w_i \text{ as } E(a_{ij} a_{kl}) =$$

1 when $ij \neq kl = \rho \sum_{i,j} m_{si} m_{ti} w_i^2 + \sum_{i,j,i',j'} m_{si} m_{ti'} w_i w_{i'} -$ $$\sum_{i,j,i',j':ij=i'j'} m_{si} m_{ti'} w_i w_{i'} + \sum_{i,j,k} m_{si} m_{ti} w_k^2 -$$

$$\sum_{i,j,k:i=k} m_{si} m_{ti} w_k^2 + \sum_{i,j,k} m_{si} m_{tk} w_k w_i -$$

$$\sum_{i,j,k:i=k} m_{si} m_{tk} w_k w_i = (\rho - 3) \sum_{i,j} m_{si} m_{ti} w_i^2 +$$

$$\sum_{i,j,i',j'} m_{si} m_{ti'} w_i w_{i'} + \sum_{i,j,k} m_{si} m_{ti} w_k^2 + \sum_{i,j,k} m_{si} m_{tk} w_k w_i =$$

$$r^2 \sum_{i,i'} m_{si} m_{ti'} w_i w_{i'} + r \sum_{i,k} m_{si} m_{ti} w_k^2 +$$

-continued $$r\sum_{i,k} m_{si}m_{tk}w_iw_k \text{ as } \rho = 3 \text{ and } j \in [1 \ldots k] =$$

$$(r^2 + r)\sum_{i,i'} m_{si}m_{ti'}w_iw_{i'} + r \cdot m_s^T \cdot m_t \sum_k w_k^2$$

In other words:

$$E(v_s v_t) = \left(1 + \frac{1}{r}\right)\sum_{i,i'} m_{si}m_{ti'}w_iw_{i'} + \frac{1}{r} \cdot m_s^T \cdot m_t \sum_k w_k^2 \tag{12}$$

The covariance $\text{Cov}(a,b)=E(a \cdot b)-E(a)E(b)$. Using this:

$$\text{Cov}(v_s, v_t) = \tag{13}$$

$$\left(1 + \frac{1}{r}\right)\sum_{i,i'} m_{si}m_{ti'}w_iw_{i'} + \frac{1}{r} \cdot m_s^T \cdot m_t \sum_k w_k^2 - E(v_s)E(v_t) =$$

$$\left(1 + \frac{1}{r}\right)\sum_{i,i'} m_{si}m_{ti'}w_iw_{i'} + \frac{1}{r} \cdot m_s^T \cdot m_t \sum_k w_k^2 - E(v_s)E(v_t) =$$

$$\left(1 + \frac{1}{r}\right)E(v_s)E(v_t) + \frac{1}{r} \cdot m_s^T \cdot m_t \sum_k w_k^2 - E(v_s)E(v_t) =$$

$$\frac{1}{r}E(v_s)E(v_t) + \frac{1}{r} \cdot m_s^T \cdot m_t \sum_k w_k^2 =$$

$$\frac{1}{r}E(v_s)E(v_t) + \frac{1}{r} \cdot (M \cdot M^T)_{st} \|w\|_2^2 =$$

$$\frac{1}{r}(M \cdot w)_s (M \cdot w)_t + \frac{1}{r} \cdot (M \cdot M^T)_{st} \|w\|_2^2 =$$

$$\frac{1}{r}((M \cdot w) \cdot (M \cdot w)^T)_{st} + \frac{1}{r} \cdot (M \cdot M^T)_{st} \|w\|_2^2$$

$\mathbb{C}(v)$ may be the covariance of v. That is, $\mathbb{C}(v)_{ij}=\text{Cov}(v_i, v_j)$. So:

$$\mathbb{C}(v) = \frac{1}{r}(M \cdot w) \cdot (M \cdot w)^T + \frac{1}{r}(M \cdot M^T)\|w\|_2^2 \tag{14}$$

Note that this computation may be used for matrix $N=M-I$ as well since nothing was assumed about the matrix M from the beginning. Therefore, $$v' = w + \frac{1}{r}N \cdot A \cdot A^T \cdot w, \; \mathbb{C}(v') = \frac{1}{r}(N \cdot w) \cdot (N \cdot w)^T + \frac{1}{r}(N \cdot N^T)\|w\|_2^2$$

since w is a constant in v' and $\mathbb{C}(a+x)=\mathbb{C}(x)$ for any constant vector a and any probabilistic vector x.

As mentioned above, the trace of a covariance matrix $\text{tr}(\mathbb{C}(v))$ may be bounded as shown by equation (10). $\mathbb{C}(v)$ may be bounded by computing its trace since $\text{tr}(\mathbb{C}(v))=\Sigma_i\text{var}(v_i)$, which is a summation of the variance of elements of v.

$$\text{tr}(\mathbb{C}(v)) = \frac{1}{4}\text{tr}((M \cdot w) \cdot (M \cdot w)^T) + \frac{1}{r}\|w\|_2^2(MM^T) \tag{15}$$

$$= \frac{1}{r}\|M \cdot w\|_2^2 + \frac{1}{r}\|w\|_2^2\left(\sum_i \lambda_i(M \cdot M^T)\right)$$

-continued $$= \frac{1}{r}\|M \cdot w\|_2^2 + \frac{1}{r}\|w\|_2^2\left(\sum_i \sigma_i(M)^2\right)$$

where $\lambda_i M \cdot M^T$ is the ith largest eigenvalue of $M \cdot M^T$, which is a square of the ith largest singular value of M, $\sigma_i(M)^2$.

Since $\|M \cdot w\|_2^2 \leq \|w\|_2^2\|M\|_2^2 = \|w\|_2^2\sigma_{max}(M)^2$, $\text{tr}(\mathbb{C}(v))$ may be bounded as follows:

$$\text{tr}(\mathbb{C}(v)) \leq \frac{1}{r}(\sigma_{max}(M)^2) + \frac{1}{r}\|w\|_2^2\left(\sum_i \sigma_i(M)^2\right) \tag{16}$$

Thus:

$$\frac{1}{r}\|w\|_2^2\left(\sum_i \sigma_i(M)^2\right) \leq \text{tr}(\mathbb{C}(v)) \tag{17}$$

Combining the two inequalities yields;

$$\frac{1}{r}\|w\|_2^2\left(\sum_i \sigma_i(M)^2\right) \leq \text{tr}(\mathbb{C}(v))\frac{1}{r}(\sigma_{max}(M)^2) + \frac{1}{r}\|w\|_2^2\left(\sum_i \sigma_i(M)^2\right) \tag{18}$$

Accordingly, the same bounds may be derived when $N=M-I$ is used. Subtracting I from a model combiner results in a matrix with a small rank. Thus, most of its singular values may be zero. The model combiner may be assumed to be generated for a linear learner, and thus the model combiner may be of the form $\Pi_i(I-\alpha x_i x_i^T)$, where any non-linear scalar terms from the Hessian may be factored into $\alpha$.

For a matrix $M_{a \to b}=\Pi_{i=b}^a(I-\alpha x_i x_i^T)$, rank $M_{a \to b} \leq b-a$. Proof may be by induction. A base case may be when $a=b$ and $M_{a \to b}=I$. Thus, $I-I=0$, which may be a rank zero. For induction, assume that rank $M_{a \to b-1}-I \leq b-a-1$. Accordingly:

$$M_{a \to b} - I = (I - \alpha x_b \cdot x_b^T)M_{a \to b-1} - I \tag{19}$$

$$= (M_{a \to b-1} - I) - \alpha x_b \cdot (x_b^T \cdot M_{a \to b-1})$$

The term $\alpha x_b \cdot (x_b^T \cdot M_{a \to b-1})$ may be a rank $-1$ matrix, and the term $(M_{a \to b-1}-I)$ may be of a rank $b-a-1$ by induction hypothesis. Since for any two matrices A and B, $\text{rank}(A+B) \leq \text{rank}(A)+\text{rank}(B) \leq \text{rank}(M_{a \to b-1}-I)+\text{rank}(-\alpha x_b \cdot x_b^T \cdot (M_{a \to b-1})) \leq b-a-1+1=b-a$.

Equation (43), as discussed below, suggests that when $\alpha_i$ is small, a model combiner $M_D(w)$ may be dominated by the I term. From the equations above, the combiner matrix $M_D(w)$ may be generated from n examples, $M_D(w)-I$ may have at most n non-zero singular values. Because each processor may operate on a subset of data, it may be likely that n examples«f features. These observations may be used to lower a variance of dimensionality reduction by projecting the matrix $N_D$ instead of $M_D$. This optimization allows for the scalability of the parallel SGD of the present disclosure (SYMSGD). With the optimization the model combiner update becomes"

$$w_i \approx S_{D_i}(w_g) + w_{i-1} - w_g + N_{D_i}(w_g) \cdot A \cdot A^T \cdot (w_{i-1} - w_g) \tag{20}$$

From the proof discussed above, approximation above may be guaranteed to be unbiased.

An important factor in controlling the singular values of $N_{D_k}(w_g)$ may be a frequency of model combinations, which may be a tunable parameter in the parallel SGD of the present disclosure (SYMSGD). As shown below, with more communication, the smaller the singular values of $N_{D_k}(w_g)$, the less variance (error) in equation (16).

As discussed below, convergence may be guaranteed when neglecting the higher order terms under certain general assumptions of the cost function, provided $\|\Delta w\|_2$ is bound. For example, a sequence $w_0, w_1, \ldots, w_t$ may represent a sequence of weight vectors produced by a sequential SGD run. As shown in FIG. 1, this sequence may converge to a desired minimum w*. A parallel SGD according to embodiments of the present disclosure may also converge to w*. A process that processes example sequences D, starting with model $w_t-\Delta w$, which is $\Delta w$ different from the "true" model $w_t$ that a sequential SGD would have started with. The output of this processor may be as follows:

$$w_{t+1} = S_D(w_t - \Delta w) + M_D \Delta w \tag{21}$$

where the model combiner after the projection by taking the I off may be given as:

$$M_D = I + (S'_D(w_t - \Delta w) - I)AA^T \tag{22}$$

Accordingly, applying Taylor's theorem, for some $0 \le \mu \le 1$:

$$S_D(w_t) = S_D(w_t - \Delta w) + S'_D(w_t - \Delta w)\Delta w + \frac{1}{2}\Delta w^T S''_D(w_t - \mu \Delta w)\Delta w \tag{23}$$

Comparing equation (23) with equation (21) may show that the parallel SGD of the present disclosure may introduce two error terms as compared to a sequential SGD.

$$w_{t+1} = S_D(w_t) + FR_D(w_t, \Delta w) + SR_D(w_t, \Delta w) \tag{24}$$

where a first-order error term FR may come due to a projection approximation:

$$FR_D(w_t, \Delta w) = (I - S'_D(w_t - \Delta w))(I - AA^T) \tag{25}$$

and where a second-order error term SR may come due to neglecting the higher-order terms in the Taylor expansion.

$$SR_D(w_t, \Delta w) = \frac{1}{2}\Delta w^T S''_D(w_t - \mu \Delta w)\Delta w \tag{26}$$

To prove convergence the parallel SGD of the present disclosure (SYMSGD), SGD may be shown to be robust with respect to adding these error terms. The proof may follow along the same lines as the convergence proof of present SGD algorithms. Below are assumptions and proofs to prove convergence.

Assuming that convexity of a cost function is:

$$(w - w^*) \cdot G(w) > 0 \tag{27}$$

for $w \ne w^*$, and assuming bounded gradients, for any input $z = (X, y)$, $$\|G_1(w)\|_2 \le b_G \|w - w^*\|_w \tag{28}$$

for some $b_G \ge 0$.

Bounds on a mean and second moment of FR, are as follows:

$$E_A(FR_D(w_t, \Delta w)) = 0 \tag{29}$$

$$E_A(\|FR_D(w_t, \Delta w)\|_2^2) \le b_{FR}\|w_t - w^*\|_2^2 \tag{30}$$

for some $b_{FR} \ge 0$.

Bounds on SR are as follows:

$$\|SR_D(w_t, \Delta w)\|_2 \le b_{SR}\|w_t - w^*\|_2 \tag{31}$$

for some $b_{FR} \ge 0$.

Convergence of a parallel SGD of the present disclosure follows if the following equation converges to 0:

$$h_t = \|w_t - w^*\|_2^2 \tag{32}$$

A worst case where error terms are added every step of the parallel SGD may be assumed. As noted above, the worst case as the error bounds from equations (29)-(31) may be for arbitrary steps. Thus, the sequence $h_t$ converges to 0 almost surely, as discussed in detail below.

$P_t$ denotes all the random choices made by the algorithm at time t. For terseness, the following notation for the conditional expectation with respect to $P_t$ may be used:

$$CE(x) = E(x|P_t) \tag{33}$$

A key technical challenge may be in showing that an infinite sum of a positive expected variations in $h_t$ is bounded, which may be shown below. $z = (x, y)$ may be an example processed at time t. The following short hand is used:

$$R_z(w_t, \Delta w) = FR_z(w_t, \Delta w) + SR_z(w_t, \Delta w) \tag{34}$$

$$CE(h_{t+1} - h_t) = -2\gamma_t(w_t - w^*)CE(G_z(w_t) + R_z(w_t, \Delta w)) + \gamma_t^2 CE(\|G_z(w_t) + R_z(w_t, \Delta w)\|_2^2)$$

$$= -2\gamma_t(w_t - w^*)(G(w_t) + CE(R_z(w_t, \Delta w))) + \gamma_t^2 CE(\|G_z(w_t) + R_z(w_t, \Delta w)\|_2^2)$$

$$\le -2\gamma_t(w_t - w^*)CE(R_z(w_t, \Delta w)) +$$
$$\gamma_t^2 CE(\|G_z(w_t) + R_z(w_t, \Delta w)\|_2^2) \text{ (from equation (27))}$$

$$\le -2\gamma_t b_{SR}\|w_t - w^*\|_2^2 +$$
$$\gamma_t^2 CE(\|G_z(w_t) + R_z(w_t, \Delta w)\|_2^2) \text{ (from equations (29)-(31))}$$

$$\le \gamma_t^2 CE(\|G_z(w_t) + R_z(w_t, \Delta w)\|_2^2)$$

$$= \gamma_t^2 CE(\|G_z(w_t)\|_2^2) + CE(\|R_z(w_t, \Delta w)\|_2^2) + 2CE(G_z(w_t)R_z(w_t, \Delta w)))$$

$$\le \gamma_t^2 ((b_G + b_{FR})\|w_t - w^*\|_2^2 + 2CE(FR_z(w_t, \Delta w)SR_z(w_t, \Delta w)) +$$
$$2CE(G_z(w_t)R_z(w_t, \Delta w))) \text{ (from equations (28)-(31))}$$

$$\le \gamma_t^2 ((b_G + b_{FR} + b_{SR})\|w_t - w^*\|_2^2 + 2CE(G_z(w_t)SR_z(w_t, \Delta w)))$$

(as FR has a zero mean (equations (29) and (30)) and G, SR do not depend on A)

$$\le \gamma_t^2 ((b_G + b_{FR} + b_{SR} + 2b_G b_{SR})\|w_t - w^*\|_2^2) \text{ (from equations (28) and (31))}$$

In other words, for $B=b_G+b_{FR}+b_{SR}+2b_G b_{SR}$, the follow:

$$CE(h_{t+1}-(I+\gamma_t^2 B)h_t) \leq 0 \qquad (35)$$

Auxiliary sequences $$\mu_t = \prod_{i=1}^{t} \frac{1}{1+\gamma_i^2 B}$$

and $h'_t = \mu_t h_t$ may be defined. $\Sigma_t \gamma_t^2 < \infty$, $\mu_t$ may be assumed to converge to a nonzero value. Since equation (35) above may imply $CE(h'_{t+1}-h'_t) \leq 0$, from quasi-martingale convergence theorem, $h'_t$, and thus, $h_t$ may converge almost surely. Under an additional assumption that $\Sigma_t \gamma_t = \infty$, this convergence may be 0.

The proof above relies on equations (29)-(31), which are proven below based on the following assumptions and proof. The discussion may be restricted to linear learners and that the model combiners are of the form $M_z(w)=(I-\alpha H_z(w)xx^T)$ for a scalar Hessian $H_z(w)$. Assuming the parallel SGD (SYMSGD) synchronizes sufficiently enough so the $\Delta w$ does not grow too large:

$$\|\Delta w\|_2 \leq \min(1, b_{\Delta w}\|w_t - w^*\|_2) \qquad (36)$$

for some $b_{\Delta w} > 0$.

Assuming, bounded Hessian:

$$|H_z(w)| \leq b_H \qquad (37)$$

for some $b_H > 0$.

The model combiner $M_D(w) = \Pi_i(I-\alpha H_z(w)x_i x_i^T)$ may have bounded eigenvalues, which follows from induction on i using the bounded Hessian of equation (37) above.

Bounds on the mean and second moment of FR of equations (29) and (30) may be proven, as explained in detail below. The second moment follows from the above, as applied to M and $M^T$, as explained in detail below.

Bounds on SR, as shown in equation (31), may be proven as follows. For linear learners:

$$S_z(w) = w - \gamma G_z(x \cdot w, y) \cdot x \qquad (38)$$

$$\frac{\partial S_z(w)}{\partial w} = I - \gamma H_z(x \cdot w, y)xx^T \qquad (39)$$

$$\frac{\partial^2 S_z(w)}{\partial w^2} = H'_z(x \cdot w, y)x \otimes x \otimes x \qquad (40)$$

where H is a second derivative of a cost with respect to $x \cdot w$, and $\otimes$ is a tensor outer product.

As to the equation (40) above, if the input is composed of a previous SGD phase, then:

$$\frac{\partial^2 S_z(S_D(w))}{\partial w^2} = H'_z(S_D(x) \cdot w, y)x \otimes x \otimes x \left(\frac{\partial S_D(w)}{\partial w}\right)^{Tx} \qquad (41)$$

For notational convenience, let $M_{b \to a} \triangleq \Pi_{i=b}^{a}(I-\alpha x_i x_i^T)$. By explicitly differentiating $S'_n(w)$:

$$\frac{\partial S'_n(w)}{\partial w} = \left(\sum_i (-\alpha_j H'_j(s_j(w))) M_{n \to j+1} x_j x_j^T M_{j \to 1}\right) \otimes (S'_j(w)^T x) \qquad (42)$$

Each element of $SR_z$ may obtained by $\Delta w^T P \Delta w$ where P is an outer product of a row from the first term above and $S'_j(w)^T x$. Using the above twice, each of these vectors may be shown to be bounded.

To generate a model combiner, $D=(z_1, z_2, \ldots, z_n)$ may be a sequence of input examples and $D_i$ may represent a subsequence $(z_1, \ldots, z_i)$. The model combiner may be given by:

$$M_D(w) = \prod_{i=n}^{1} (I - \alpha_i \cdot H_{z_i}(S_{D_{i-1}}(w), x_i, y_i)) \qquad (43)$$

with $S_{D_0}(w) = w$, based on:

$$S_D(w) = S_{z_n}(S_{z_{n-1}}(\ldots(S_{z_0}(w)))) \qquad (44)$$

which follows from equation (3) above and the chain rule.

Figure 2A:
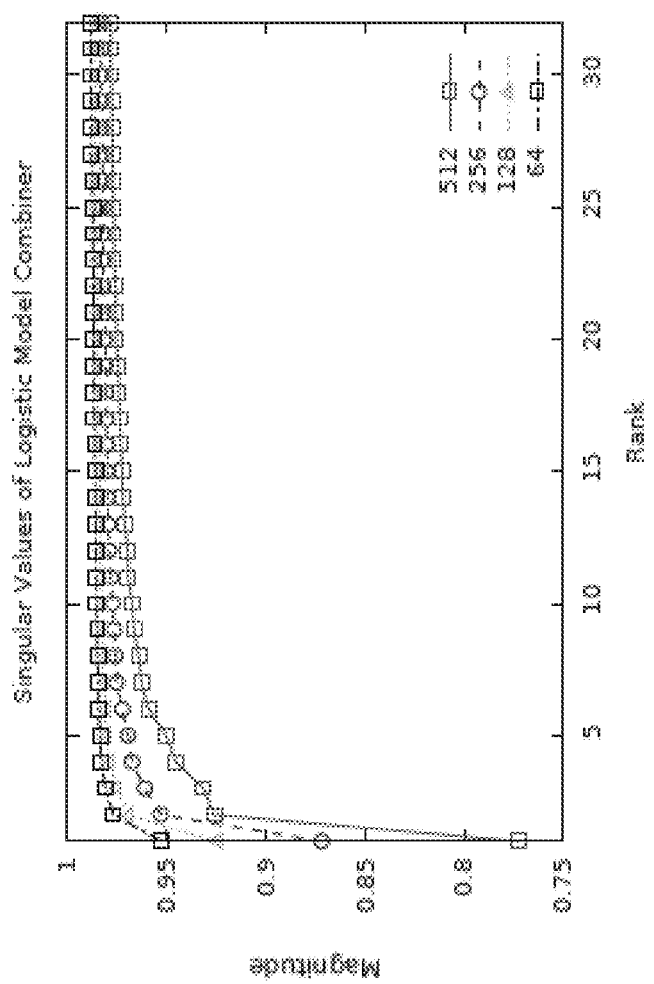
FIGS. 2A and 2B depict graphs that plot singular values of a model combiner, according to embodiments of the present disclosure.
Figure 2B:
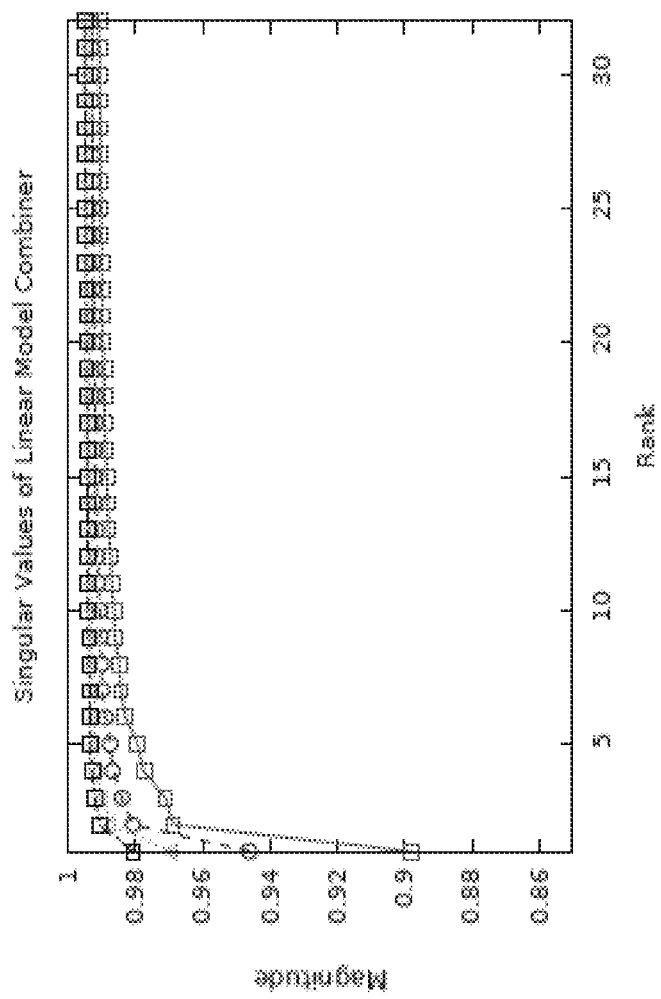
Figure 4C:
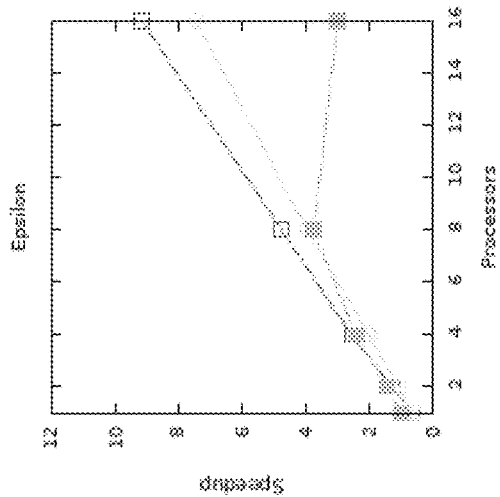
FIGS. 4A-4F depict graphs showing differences between parallel SGD algorithms of the present disclosure (Async-SYMSGD and MR-SYMSGD) and HOGWILD! for various exemplary datasets.
Figure 4B:
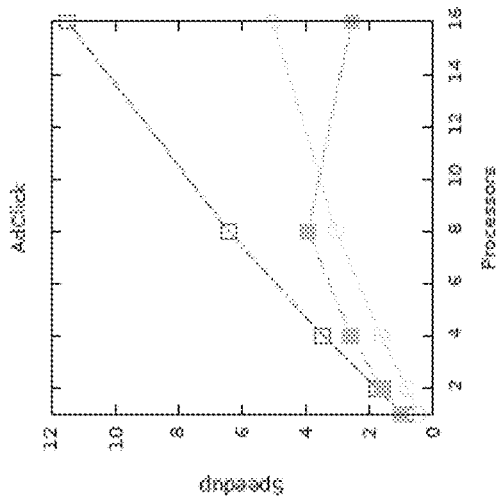
Figure 4A:
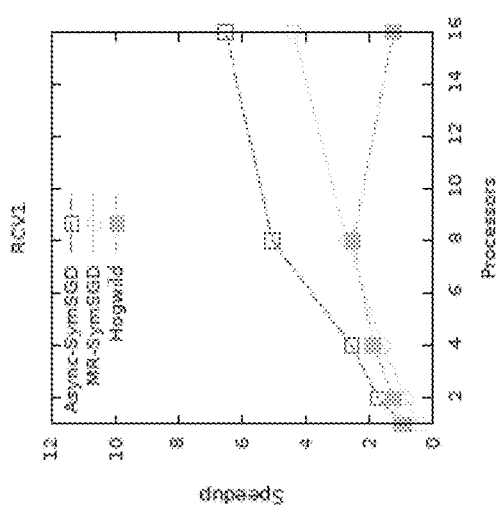
Figure 4F:
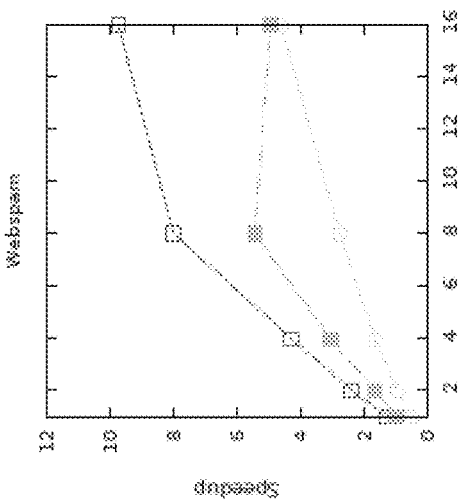
Figure 4E:
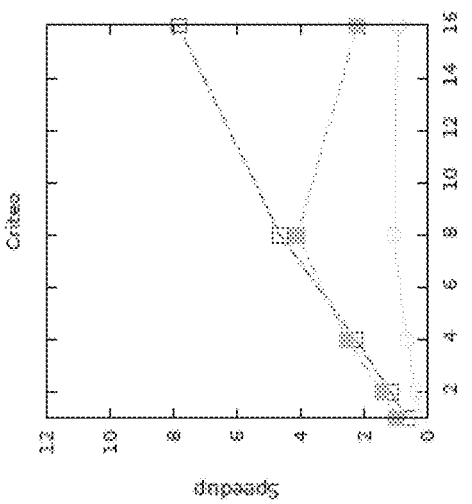
Figure 4D:
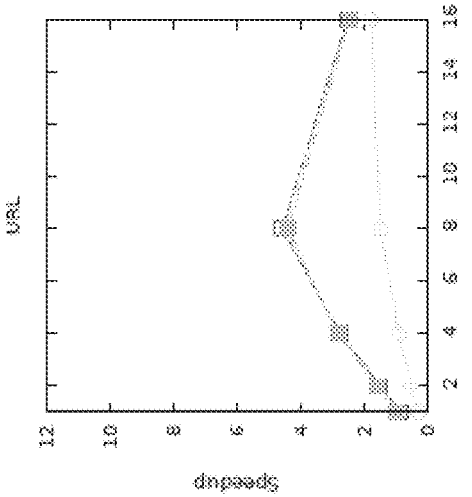

FIGS. 2A and 2B depict graphs that plot singular values of a model combiner $M_D(w)$, according to embodiments of the present disclosure. In particular, FIG. 2A shows the distribution of singular values of model combiners for an exemplary data set, such as Reuters Corpus Volume I ("RCV1") dataset, for logistic regression with $\alpha=0.01$, and FIG. 2B shows the distribution of singular values of model combiners for an exemplary data set, such as RCV1 dataset, for linear regression with $\alpha=0.001$. Each of the different lines shown in the graphs may correspond to different block sizes.

As mentioned above, the graphs of FIGS. 2A and 2B plot the singular values of a model combiner $M_D(w)$ for RCV1 after processing 64, 128, 256, and 512 examples for logistic and linear regression. As depicted in FIGS. 2A and 2B, the singular values may be close to one (1). However, the singular values of $N_D(w) = M_D(w) - I$ may be roughly the same as those of $M_D(w)$ minus 1, and consequently, may be small. Further, a smaller $\alpha$ (not shown), the closer the singular values of the model combiner $M_D(w)$ may be to one (1), and the singular values of $N_D(w)$ may be close to zero (0). Also as shown in FIGS. 2A and 2B, the singular values of model combiner $M_D(w)$ may decrease as the numbers of examples increase, and therefore, the singular values of $N_D(w)$ may increase. As a result, the more frequent the models may be combined, the less variance (and error) may be introduced.

Discussed below are implementations of various parallel SGD algorithms according to embodiments of the present disclosure (SYMSGD). As described above, a map-reduce style version of the parallel SGD algorithm according to embodiments of the present disclosure was referred to as map-reduce SYMSGD and/or MR-SYMSGD. In contrast to MR-SYMSGD, HOGWILD! asynchronously updates model parameters.

Because the map-reduce SYMSGD accord to embodiments of the present disclosure may require computing model combiners, map-reduce SYMSGD may do more work than HOGWILD! Thus, map-reduce SYMSGD may be a constant factor slower than HOGWILD!

However, even sparse datasets have a frequently used subset of features, which may be likely to show up in many input examples. The frequent used subset of features can cause scalability issues for HOGWILD! When cache-lines are invalidated across sockets, which happens often for these frequently accessed subset, HOGWILD! can incur large overheads, which limit HOGWILD!'s scalability.

A parallel SGD algorithm according to embodiments of the present disclosure may blend asynchronous updates of infrequent model parameters with the map-reduce SYMSGD style updates for the frequent model parameters. The parallel SGD algorithm that blends asynchronous updates with the map-reduce SYMSGD style updates may be referred to as asynchronous SYMSGD and/or Async-SYMSGD.

Because the frequently accessed subset of features may be much smaller than the infrequently accessed subset of features, Async-SYMSGD has low-overhead. However, because cache-lines may not be invalidated as often, Async-SYMSGD may scale to multiple sockets.

An average NFNZ ratio (shown in Table 2 below) may be an average number of frequent features in each input example divided by a number of non-zero features in that input example. Thus, a value of zero (0) may mean all features are infrequent, and a value of one (1) may mean all features are frequent. A frequent feature may be defined as whether a particular feature shows up in at least ten percent (10%) of the input examples. At runtime, Async-SYMSGD may sample one thousand (1000) input examples to find frequent features, may build a model combiner for that subset, and may asynchronously update those features not in that subset.

Equation (4) shows that an error in SYMSGD may be dependent on the norm of $\Delta w$. Accordingly, the smaller the norm of $\Delta w$, the less the error. To control the norm of $\Delta w$ may be done by limiting a number of examples that each processor sees before the processor combines its local model with the global model. This parameter may be referred to as the block size. Larger block size may allow the parallel SGD of the present disclosure (SYMSGD) to communicate less often and improve overall running time, but the larger block size may suffer in accuracy due to a size of $\Delta w$. Conversely, lower values for block size may exhibit better convergence, but overhead of model combination may affect the performance.

Block size may be set to a constant value per benchmark throughout the execution of the parallel SGD of the present disclosure (SYMSGD). In an alternative embodiment, block size may be set to dynamically adjust when to communicate by measuring the norm of $\Delta w$ While the computational complexity of computing a model combiner O(k) (where k<15 in all experiments), a k×slowdown may not be seen. Each processor may consecutively store each of the k vectors in A so the parallel SGD of the present disclosure (SYMSGD) may exploit good cache locality in addition to SIMD units. FIGS. 3A-3F depict graphs showing differences between parallel SGD algorithms of the present disclosure (Async-SYMSGD and MR-SYMSGD) and HOGWILD! for various exemplary datasets, according to embodiments of the present disclosure. In particular, FIGS. 3A-3F show speedup of logistic regression training when using Async-SYMSGD, MR-SYMSGD, and HOGWILD! on a sixteen (16) core machine. As shown in FIGS. 3A-3F, Async-SYMSGD, MR-SYMSGD, and HOGWILD! with one (1) processor have nearly zero (0) difference even though SYMSGD may do k times more work than HOGWILD!

Further, SYMSGD may use a sparse projection to reduce the overhead of computing A. Each element of A may independently be chosen from $$\left\{\frac{1}{3}, -\frac{1}{3}, 0\right\}$$

with a probability of $$\left\{\frac{1}{6}, \frac{1}{6}, \frac{2}{3}\right\},$$

respectively.

According to embodiments of the present disclosure, experiments were performed on a machine including two Intel Xeon E5-2630 v3 processors clocked at 2.4 GHz with 256 GB of Random Access Memory ("RAM"). The machine includes two sockets with 8 cores for each processor, which allowed for a study of the scalability of the parallel SDG algorithms of the present disclosure across multiple sockets. Hyper-threading and turbo boosting of the processors was disabled. Threads were pinned to cores in a compact way, which means that thread i+1 was placed as close as possible to thread i. The above described machine runs Windows 10, and implementations were compiled with Intel C/C++ compiler 16.0 and relied heavily on Open Multi-Processing ("OpenMP") primitives for parallelization and Math Kernal Library ("MKL") for efficient linear algebra computations. Additionally, to measure runtime, an average of five independent runs was used on an otherwise idle machine.

As mentioned above, FIGS. 3A-3F depict graphs showing differences between parallel SGD algorithms of the present disclosure (Async-SYMSGD and MR-SYMSGD) and HOGWILD! for various exemplary datasets, according to embodiments of the present disclosure. For each, ordinary least squares ("OLS") regression and logistic regression were experimented with. (See, Table 1 above for the model combiners).

FIGS. 4A-4F depict graphs showing differences between parallel SGD algorithms of the present disclosure (Async-SYMSGD and MR-SYMSGD) and HOGWILD! for various exemplary datasets, according to embodiments of the present disclosure. In particular, FIGS. 4A-4F show speedup of least squares regression training when using Async-SYMSGD, MR-SYMSGD, and HOGWILD! on a sixteen (16) core machine.

Discussed below are results for logistic regression. To study the scalability of a parallel algorithm, it is important to compare the algorithms against an efficient baseline. Otherwise, it may not be empirically possible to differentiate between the scalability achieved from the parallelization of the inefficiencies and the scalability inherent in the algorithm. The datasets used in experiments herein are described in Table 2, which includes various statistics of each benchmark.

TABLE 2

| Dataset | Number of Features | Number of Examples | Average NNZ | Average NFNZ Ratio | AUC Logistic | AUC Linear | SYMSGD speedup over HOGWILD! Logistic | SYMSGD speedup over HOGWILD! Linear |
|---|---|---|---|---|---|---|---|---|
| RCV1 | 47153 | 781265 | 74.71 | 0.219 | 0.9586 | 0.959 | 2.6 | 2.6 |
| AdClick | 3076 | 499980 | 969.38 | 0.947 | 0.7443 | 0.7654 | 2.99 | 2.94 |
| Epsilon | 2000 | 400000 | 2000 | 1.00 | 0.9586 | 0.959 | 2.55 | 2.45 |
| URL | 3231961 | 1677282 | 111.62 | 0.765 | 0.9991 | 0.9986 | 1.90 | 1.04 |
| Criteo | 1703961 | 1000000 | 33.32 | 0.530 | 0.7627 | 0.7633 | 2.05 | 1.91 |
| Webspam | 16609143 | 279999 | 3727.75 | 0.693 | 0.9992 | 0.9909 | 1.43 | 1.78 |

For each algorithm and benchmark, a parameter sweep was done over the learning rate, $\alpha$, and $\alpha$ was picked which gave the best area under the curve (often referred to as simply the "AUC") after 10 passes over the data. For Async-SYMSGD and MR-SYMSGD, $\alpha$ was then fixed and swept over block size and k, and the configuration which maintained sequential accuracy up to the fourth digit was picked.

The last two columns of Table 2 summarize the speedup of Async-SYMSGD over HOGWILD! for both logistic and linear regression. As shown in the experimental results, Async-SYMSGD may be, on average, 2.25× faster than HOGWILD! A reason is that Async-SYMSGD of the present disclosure may be able to scale to multiple sockets because cache-traffic from the frequent subset of each example causes HOGWILD! to suffer scalability when moving from 8 to 16 cores. FIGS. 3A-3F and 4A-4F show this phenomenon in greater detail. A point on these graphs (x-axis, y-axis) shows the speedup of Async-SYMSGD, MR-SYMSGD, and HOGWILD!, respectively, (y-axis) as a function of the number of threads (x-axis). In Each benchmark indicates that HOGWILD! is slower on 16 threads than 8 (with the exception of the Webspam dataset where performance stays roughly constant). In contrast both Async-SYMSGD and MR-SYMSGD scale across sockets roughly linearly. Because Async-SYMSGD uses a model combiner only for those frequently accessed subset of features, Async-SYMSGD's overhead may be lower than MR-SYMSGD's. Thus, Async-SYMSGD may be consistently faster than MR-SYMSGD. The results are similar for linear regression with the exception of URL: Async-SYMSGD stops scaling at 8 threads, like HOGWILD!

Figure 5:
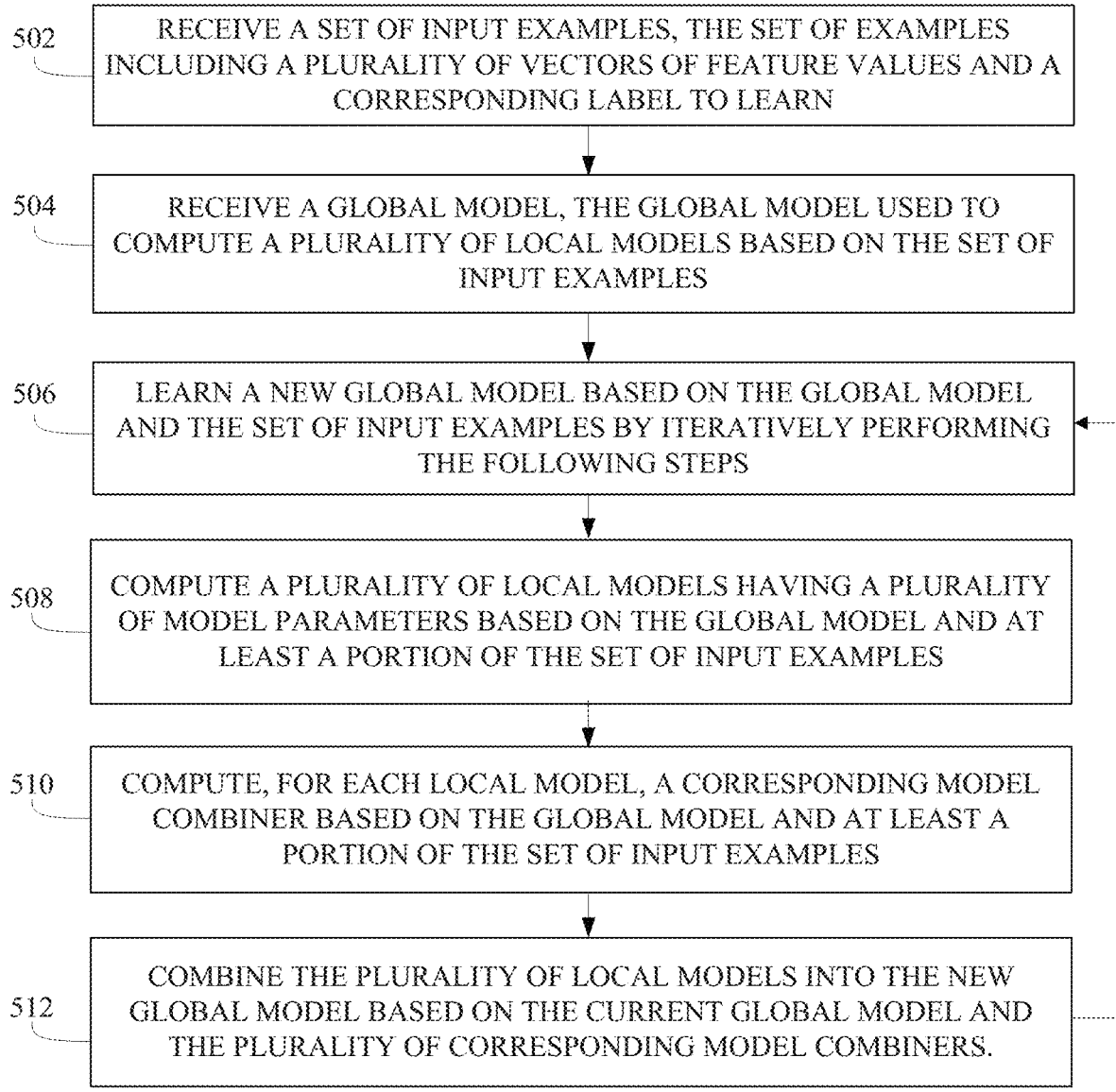
FIG. 5 depicts a method for parallel stochastic gradient descent using linear and non-linear functions, according to embodiments of the present disclosure.
Figure 6:
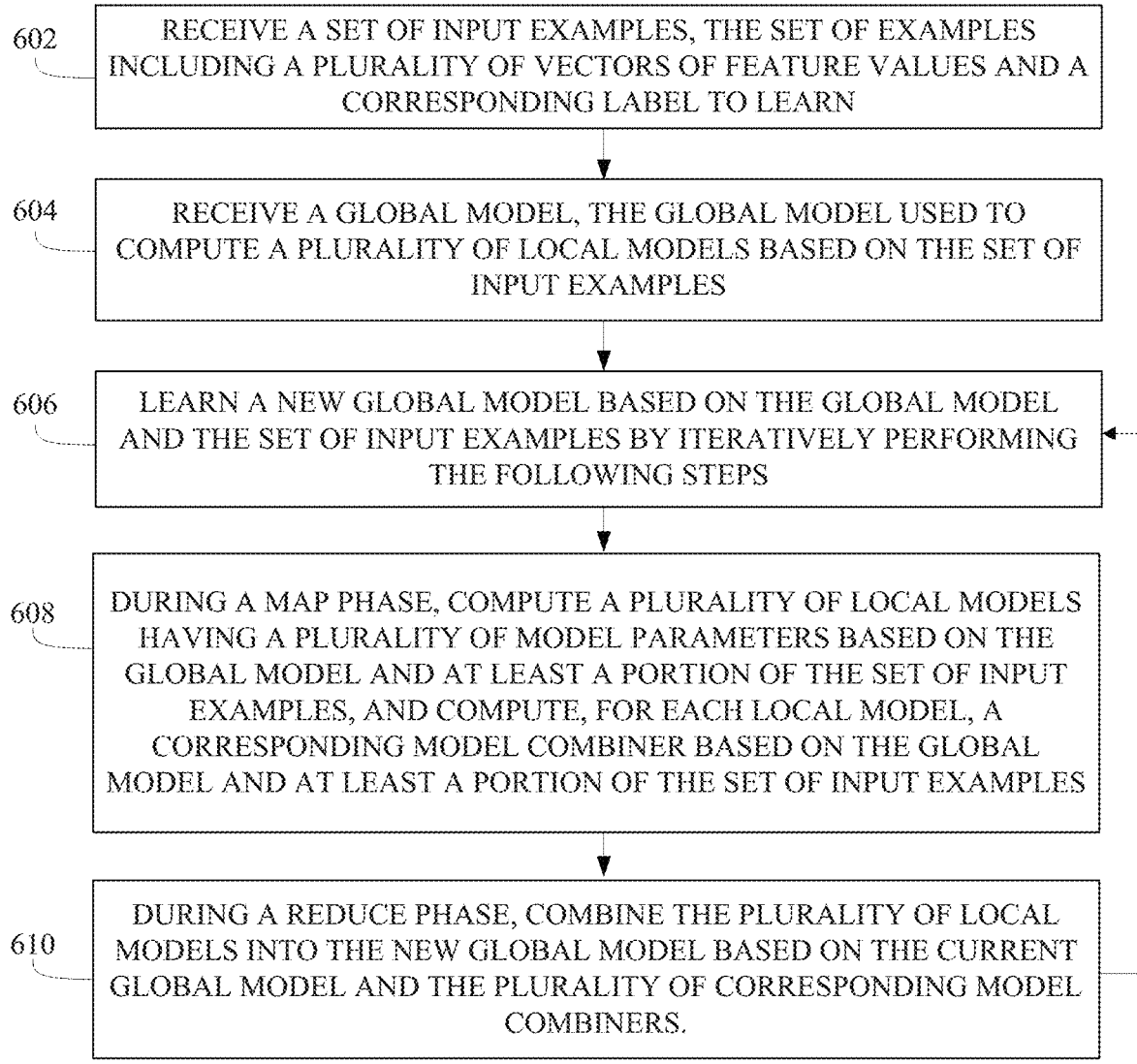
FIG. 6 depicts a method for a map-reduce version of parallel stochastic gradient descent using linear and non-linear functions, according to embodiments of the present disclosure.
Figure 7:
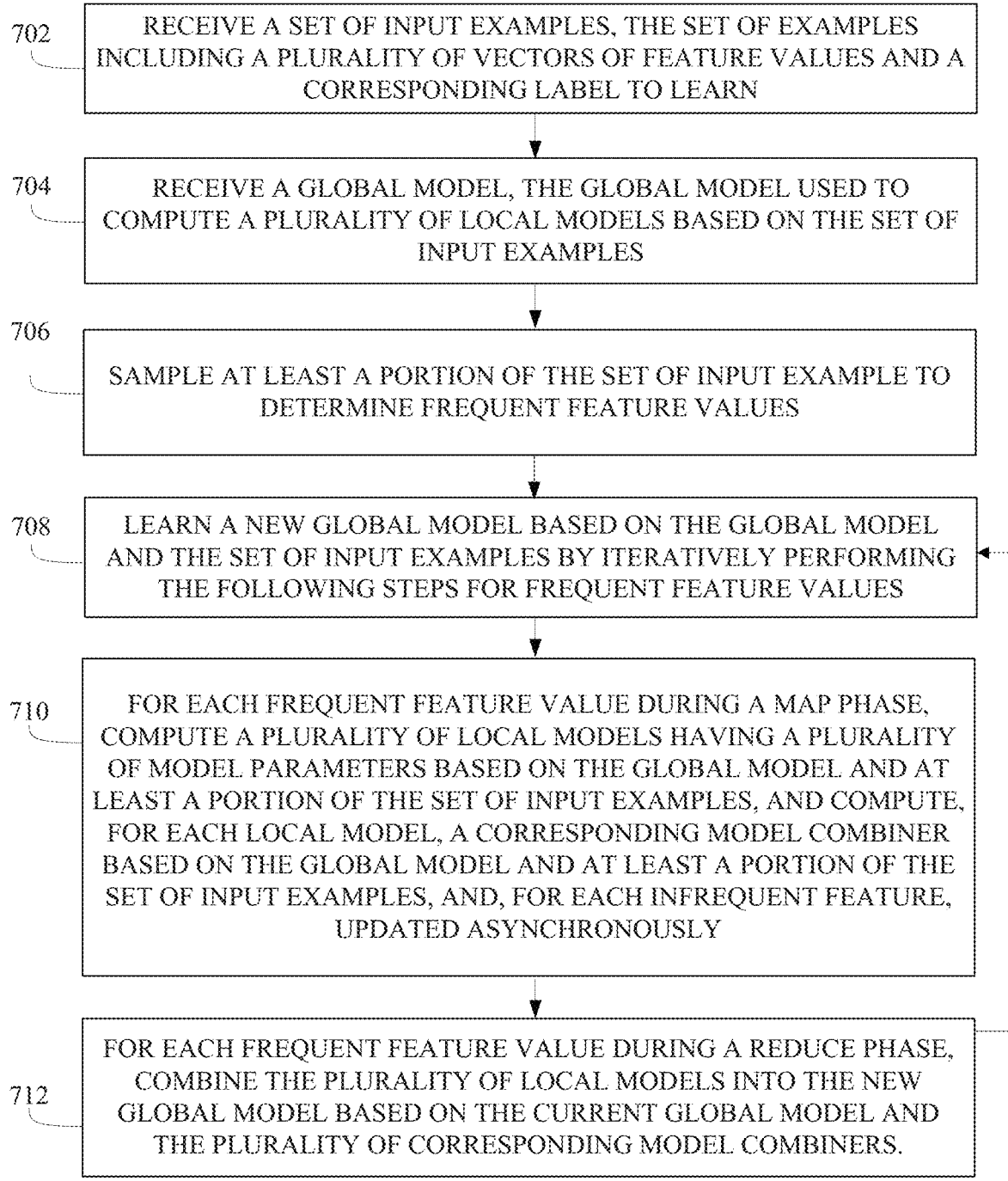
FIG. 7 depicts a method for an asynchronous version of parallel stochastic gradient descent using linear and non-linear functions, according to embodiments of the present disclosure.

FIGS. 5-7 depict exemplary methods for parallel stochastic gradient descent using linear and non-linear functions, according to embodiments of the present disclosure. While the methods are shown and described as being a series of acts that are performed in a sequence, it is to be understood and appreciated that the methods are not limited by the order of the sequence. For example, some acts may occur in a different order than what is described herein. In addition, an act may occur concurrently with another act. Further, in some embodiments, not all acts may be required to implement methods described herein.

Moreover, the acts described herein may be computer-executable instructions that may be implemented by one or more processors and/or stored on a non-transitory computer-readable medium or media. The computer-executable instructions may include a routine, a sub-routine, programs, a thread of execution, and/or the like. Still further, results of acts of the methods may be stored in a non-transitory computer-readable medium, displayed on a display device, and/or the like.

FIG. 5 depicts a method 500 for parallel stochastic gradient descent using linear and non-linear functions, according to embodiments of the present disclosure. Method 500 may begin at step 502 where a set of input examples may be received. The set of examples may include a plurality of vectors of feature values and a corresponding label to learn. A stochastic gradient descent algorithm may iteratively process the input dataset in which computation at each iteration may depend on model parameters learned from the previous iteration. At step 504, the method may receive a global model, the global model used to compute a plurality of local models based on the set of input examples. Periodically, the global model may be updated with the local models while using the model combiner to account for changes in the global model that occurred in the interim.

Upon receiving the set of input examples and the global model, a new global model may be learned based on the global model and the set of input examples by iteratively performing the following steps at step 506. Each global model may be dependent on a previous model, and may make parallelization of stochastic gradient descent across iterations difficult. Using model combiners with local models allows for the models to be combined into a new global model.

At step 508, a plurality of local models having a plurality of model parameters may be computed based on the global model and at least a portion of the set of input examples. The plurality of model parameters may be linearly updated based on a machine learning algorithm including one or more of linear regression, linear regression with L2 regularization, and polynomial regression. Additionally, and/or alternatively, the plurality of model parameters may be non-linearly updated based on a machine learning algorithm including logistic regression. At step 510 for each local model, a corresponding model combiner may be computed based on the global model and at least a portion of the set of input examples. Additionally, and/or alternatively, for each local model, a corresponding projected model combiner may be computed based on the global model and at least a portion of the set of input examples. The model combiners may be large f×f matrices. Machine learning problems may involve learning over tens of thousands to billions of features, and thus, a model combiner may not be explicitly represented. Accordingly, as discussed above, a projected model combiner may be used to project the model combiner matrix into a smaller dimension while maintaining its fidelity.

Then at step 512, the plurality of local models may be combined into the new global model based on the current global model and the corresponding plurality of model combiners and/or the corresponding plurality of projected model combiners.

FIG. 6 depicts a method 600 for a map-reduce version of parallel stochastic gradient descent using linear and non-linear functions, according to embodiments of the present disclosure.

Method 600 may begin at step 602 where a set of input examples may be received. The set of examples may include a plurality of vectors of feature values and a corresponding label to learn. A stochastic gradient descent algorithm may iteratively process the input dataset in which computation at each iteration may depend on model parameters learned from the previous iteration. At step 604, the method may receive a global model, the global model used to compute a plurality of local models based on the set of input examples. Periodically, the global model may be updated with the local models while using the model combiner to account for changes in the global model that occurred in the interim.

Upon receiving the set of input examples and the global model, a new global model may be learned based on the global model and the set of input examples by iteratively performing the following steps at step 606. Each global model may be dependent on a previous model, and may make parallelization of stochastic gradient descent across iterations difficult. Using model combiners with local models allows for the models to be combined into a new global model.

At step 608, during a map phase, a plurality of local models having a plurality of model parameters may be computed based on the global model and at least a portion of the set of input examples, and, for each local model, a corresponding model combiner based on the global model and at least a portion of the set of input examples. The plurality of model parameters may be linearly updated based on a machine learning algorithm including one or more of linear regression, linear regression with L2 regularization, and polynomial regression. Additionally, and/or alternatively, the plurality of model parameters may be non-linearly updated based on a machine learning algorithm including logistic regression. Additionally, and/or alternatively, for each local model, a corresponding projected model combiner may be computed based on the global model and at least a portion of the set of input examples. The model combiners may be large f×f matrices. Machine learning problems may involve learning over tens of thousands to billions of features, and thus, a model combiner may not be explicitly represented. Accordingly, as discussed above, a projected model combiner may be used to project the model combiner matrix into a smaller dimension while maintaining its fidelity.

Then at step 610, during a reduce phase, the plurality of local models may be combined into a new global model based on the current global model and the plurality of corresponding model combiners and/or the corresponding plurality of projected model combiners.

FIG. 7 depicts a method 700 for an asynchronous version of parallel stochastic gradient descent using linear and non-linear functions, according to embodiments of the present disclosure.

Method 700 may begin at step 702 where a set of input examples may be received. The set of examples may include a plurality of vectors of feature values and a corresponding label to learn. A stochastic gradient descent algorithm may iteratively process the input dataset in which computation at each iteration may depend on model parameters learned from the previous iteration. At step 704, the method may receive a global model, the global model used to compute a plurality of local models based on the set of input examples. Periodically, the global model may be updated with the local models while using the model combiner to account for changes in the global model that occurred in the interim. At step 706, the method may sample at least a portion of the set of input examples to determine and/or find frequent feature values. For each frequent feature value found, the map reduce version of the parallel stochastic gradient descent algorithm may be used. For each infrequent feature value, the features may be asynchronously updated.

For frequent features values, upon receiving the set of input examples and the global model, a new global model may be learned based on the global model and the set of input examples by iteratively performing the following steps at step 708. Each global model may be dependent on a previous model, and may make parallelization of stochastic gradient descent across iterations difficult. Using model combiners with local models allows for the models to be combined into a new global model.

At step 710, for each frequent feature value during a map phase, a plurality of local models having a plurality of model parameters may be computed based on the global model and at least a portion of the set of input examples, and, for each local model, a corresponding model combiner based on the global model and at least a portion of the set of input examples. The plurality of model parameters may be linearly updated based on a machine learning algorithm including one or more of linear regression, linear regression with L2 regularization, and polynomial regression. Additionally, and/or alternatively, the plurality of model parameters may be non-linearly updated based on a machine learning algorithm including logistic regression. Additionally, and/or alternatively, for each local model, a corresponding projected model combiner may be computed based on the global model and at least a portion of the set of input examples. The model combiners may be large f×f matrices. Machine learning problems may involve learning over tens of thousands to billions of features, and thus, a model combiner may not be explicitly represented. Accordingly, as discussed above, a projected model combiner may be used to project the model combiner matrix into a smaller dimension while maintaining its fidelity. Further, each infrequent feature may be updated asynchronously, as discussed above.

Then at step 712, for each frequent feature value during a reduce phase, the plurality of local models may be combined into a new global model based on the current global model and the plurality of corresponding model combiners and/or the corresponding plurality of projected model combiners. For each infrequent feature value asynchronously update the plurality of model parameters. A frequent feature value may be a particular feature that shows up in at least 10% of the set of input examples. Additionally, or alternatively, other frequency determinations may be used to determine a whether a feature value is a frequent feature value, such as 5%, 10%, 15%, 20%, 25%, etc.

Figure 8:
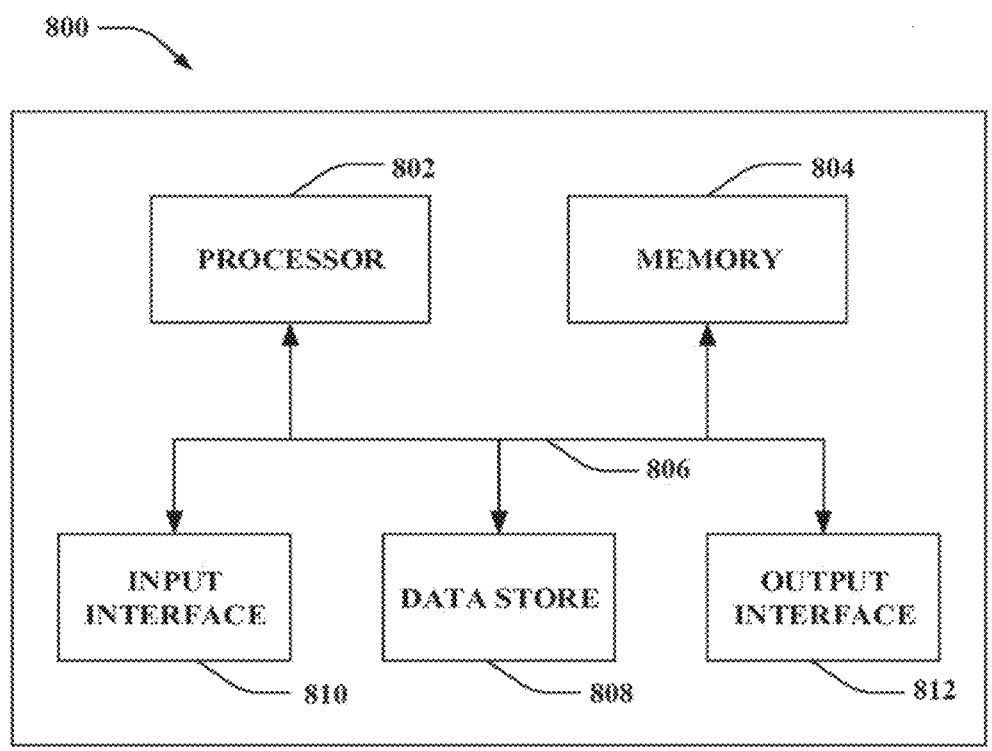
FIG. 8 depicts a high-level illustration of an exemplary computing device that may be used in accordance with the systems, methods, and computer-readable media disclosed herein, according to embodiments of the present disclosure.

FIG. 8 depicts a high-level illustration of an exemplary computing device 800 that may be used in accordance with the systems, methods, and computer-readable media disclosed herein, according to embodiments of the present disclosure. For example, the computing device 800 may be used in a system that performs parallel stochastic gradient descent using linear and non-linear activation functions, according to embodiments of the present disclosure. The computing device 800 may include at least one processor 802 that executes instructions that are stored in a memory 804. The instructions may be, for example, instructions for implementing functionality described as being carried out by one or more components discussed above or instructions for implementing one or more of the methods described above. The processor 802 may access the memory 804 by way of a system bus 806. In addition to storing executable instructions, the memory 804 may also store snapshots, event logs, and so forth.

The computing device 800 may additionally include a data store 808 that is accessible by the processor 802 by way of the system bus 806. The data store 808 may include executable instructions, data, examples, features, etc. The computing device 800 may also include an input interface 810 that allows external devices to communicate with the computing device 800. For instance, the input interface 810 may be used to receive instructions from an external computer device, from a user, etc. The computing device 800 also may include an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 800 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for example, several devices may be in communication by way of a network connection and may collectively perform tasks described as being performed by the computing device 800.

Figure 9:
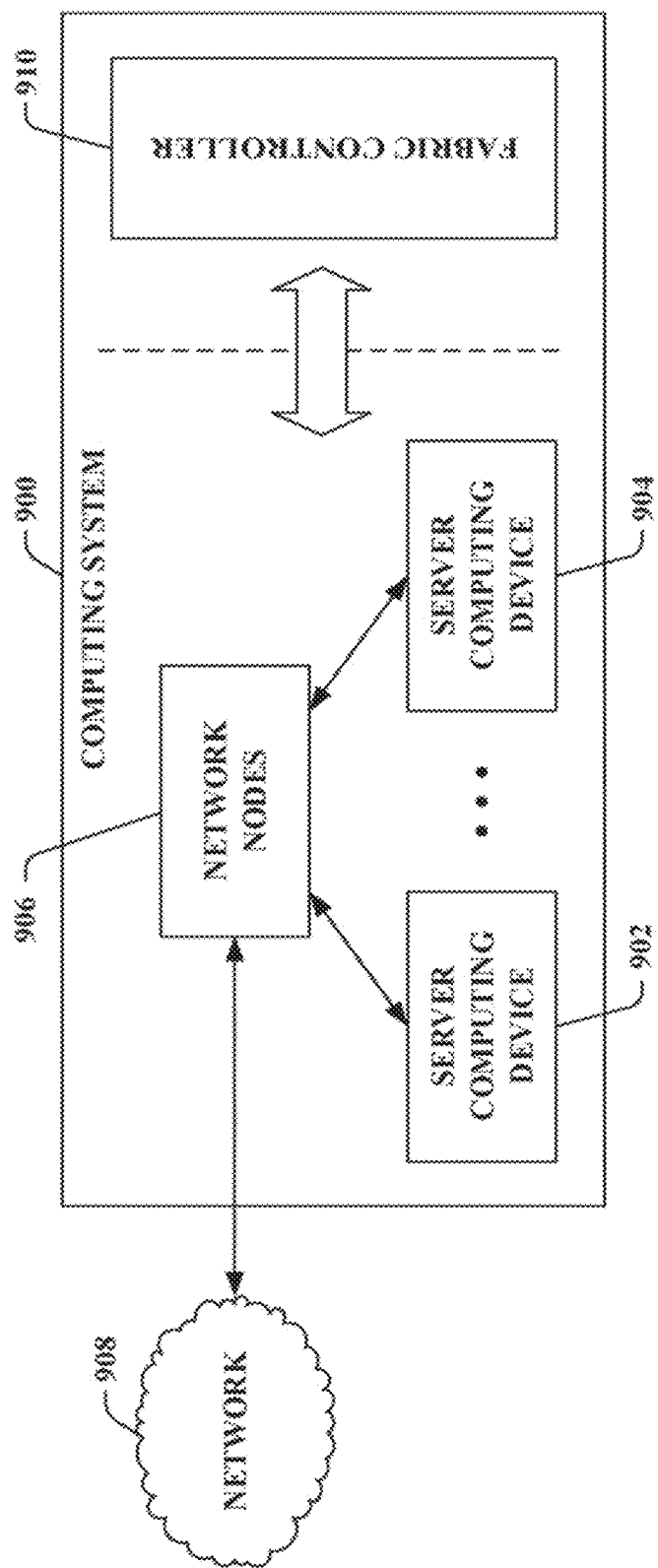
FIG. 9 depicts a high-level illustration of an exemplary computing system that may be used in accordance with the systems, methods, and computer-readable media disclosed herein, according to embodiments of the present disclosure.

Turning to FIG. 9, FIG. 9 depicts a high-level illustration of an exemplary computing system 900 that may be used in accordance with the systems, methods, and computer-readable media disclosed herein, according to embodiments of the present disclosure. For example, the computing system 900 may be or may include the computing device 800. Additionally, and/or alternatively, the computing device 800 may be or may include the computing system 900.

The computing system 900 may include a plurality of server computing devices, such as a server computing device 902 and a server computing device 904 (collectively referred to as server computing devices 902-904). The server computing device 902 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 902, at least a subset of the server computing devices 902-904 other than the server computing device 902 each may respectively include at least one processor and a memory. Moreover, at least a subset of the server computing devices 902-904 may include respective data stores.

Processor(s) of one or more of the server computing devices 902-904 may be or may include the processor, such as processor 802. Further, a memory (or memories) of one or more of the server computing devices 902-904 can be or include the memory, such as memory 804. Moreover, a data store (or data stores) of one or more of the server computing devices 902-904 may be or may include the data store, such as data store 808.

The computing system 900 may further include various network nodes 906 that transport data between the server computing devices 902-904. Moreover, the network nodes 906 may transport data from the server computing devices 902-904 to external nodes (e.g., external to the computing system 900) by way of a network 908. The network nodes 902 may also transport data to the server computing devices 902-904 from the external nodes by way of the network 908. The network 908, for example, may be the Internet, a cellular network, or the like. The network nodes 906 may include switches, routers, load balancers, and so forth.

A fabric controller 910 of the computing system 900 may manage hardware resources of the server computing devices 902-904 (e.g., processors, memories, data stores, etc. of the server computing devices 902-904). The fabric controller 910 may further manage the network nodes 906. Moreover, the fabric controller 910 may manage creation, provisioning, de-provisioning, and supervising of managed runtime environments instantiated upon the server computing devices 902-904.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for parallel stochastic gradient descent using linear and non-linear activation functions, the method comprising:
    receiving a set of input examples, the set of examples including a plurality of vectors of feature values and a corresponding label to learn;
    receiving a global model, the global model used to compute a plurality of local models based on the set of input examples;
    randomly sampling the set of input examples to determine frequent feature values, wherein a frequent feature value is included in at least 10% of the set of input examples;
    determining the frequent feature values based on the random sampling; and
    learning a new global model based on the global model and the set of input examples by iteratively performing the following steps:
        computing, for each determined frequent feature value during a map phase, a plurality of local models having a plurality of model parameters based on the global model and at least a portion of the set of input examples;
        asynchronously updating, for each determined infrequent feature value during the map phase, the plurality of model parameters;
        computing, for each local model during the map phase, a corresponding model combiner based on the global model and at least a portion of the set of input examples and lowering a variance of dimensionality reduction by projecting a matrix of the corresponding model combiner and reducing singular values of the matrix; and
        combining, for each determined frequent feature value during a reduce phase, the plurality of local models into the new global model based on the current global model and the plurality of corresponding model combiners.

2. The method according to claim 1, wherein the plurality of model parameters are linearly updated based on a machine learning algorithm including one or more of linear regression, linear regression with L2 regularization, polynomial regression, ordinary least squares ("OLS"), perceptron, support vector machine, ("SVM"), and lasso.

3. The method according to claim 1, wherein the plurality of model parameters is non-linearly updated based on a machine learning algorithm including logistic regression.

4. The method according to claim 1, wherein computing, for each local model, a corresponding model combiner includes:
    computing, for each local model, a corresponding projected model combiners based on the global model and at least a portion of the set of input examples.

5. The method according to claim 1, wherein sampling the set of input examples to determine frequent feature values includes randomly sampling a portion of the set of input examples to determine the frequent feature values.

6. A system for parallel stochastic gradient descent using linear and non-linear activation functions, the system including:
    a data storage device that stores instructions for parallel stochastic gradient descent using linear and non-linear activation functions; and
    a processor configured to execute the instructions to perform a method including:
        receiving a set of input examples, the set of examples including a plurality of vectors of feature values and a corresponding label to learn;
        receiving a global model, the global model used to compute a plurality of local models based on the set of input examples;
        randomly sampling the set of input examples to determine frequent feature values, wherein a frequent feature value is included in at least 10% of the set of input examples;
        determining the frequent feature values based on the random sampling; and
        learning a new global model based on the global model and the set of input examples by iteratively performing the following steps:
            computing, for each determined frequent feature value during a map phase, a plurality of local models having a plurality of model parameters based on the global model and at least a portion of the set of input examples;
            asynchronously updating, for each determined infrequent feature value during the map phase, the plurality of model parameters;
            computing, for each local model during the map phase, a corresponding model combiner based on the global model and at least a portion of the set of input examples and lowering a variance of dimensionality reduction by projecting a matrix of the corresponding model combiner and reducing singular values of the matrix; and
            combining, for each determined frequent feature value during a reduce phase, the plurality of local models into the new global model based on the current global model and the plurality of corresponding model combiners.

7. The system according to claim 6, wherein the plurality of model parameters are linearly updated based on a machine learning algorithm including one or more of linear regression, linear regression with L2 regularization, polynomial regression, ordinary least squares ("OLS"), perceptron, support vector machine, ("SVM"), and lasso.

8. The system according to claim 6, wherein the plurality of model parameters is non-linearly updated based on a machine learning algorithm including logistic regression.

9. The system according to claim 6, wherein computing, for each local model, a corresponding model combiner includes:

computing, for each local model, a corresponding projected model combiners based on the global model and at least a portion of the set of input examples.

10. The system according to claim 6, wherein sampling the set of input examples to determine frequent feature values includes randomly sampling a portion of the set of input examples to determine the frequent feature values.

11. A non-transitory computer-readable medium storing instructions that, when executed by a computer, cause the computer to perform a method for parallel stochastic gradient descent using linear and non-linear activation functions, the method including:
   receiving a set of input examples, the set of examples including a plurality of vectors of feature values and a corresponding label to learn;
   receiving a global model, the global model used to compute a plurality of local models based on the set of input examples;
   randomly sampling the set of input examples to determine frequent feature values, wherein a frequent feature value is included in at least 10% of the set of input examples;
   determining the frequent feature values based on the random sampling; and
   learning a new global model based on the global model and the set of input examples by iteratively performing the following steps:
      computing, for each determined frequent feature value during a map phase, a plurality of local models having a plurality of model parameters based on the global model and at least a portion of the set of input examples;
      asynchronously updating, for each determined infrequent feature value during the map phase, the plurality of model parameters;
      computing, for each local model during the map phase, a corresponding model combiner based on the global model and at least a portion of the set of input examples and lowering a variance of dimensionality reduction by projecting a matrix of the corresponding model combiner and reducing singular values of the matrix; and
      combining, for each determined frequent feature value during a reduce phase, the plurality of local models into the new global model based on the current global model and the plurality of corresponding model combiners.

12. The computer-readable medium according to claim 11, wherein the plurality of model parameters are linearly updated based on a machine learning algorithm including one or more of linear regression, linear regression with L2 regularization, polynomial regression, ordinary least squares ("OLS"), perceptron, support vector machine, ("SVM"), and lasso.

13. The computer-readable medium according to claim 11, wherein the plurality of model parameters is non-linearly updated based on a machine learning algorithm including logistic regression.

14. The computer-readable medium according to claim 11, wherein computing, for each local model, a corresponding model combiner includes:
   computing, for each local model, a corresponding projected model combiners based on the global model and at least a portion of the set of input examples.

15. The computer-readable medium according to claim 11, wherein sampling the set of input examples to determine frequent feature values includes randomly sampling a portion of the set of input examples to determine the frequent feature values.

* * * * *